United States Patent
Kim et al.

(10) Patent No.: US 9,965,205 B2
(45) Date of Patent: May 8, 2018

(54) DATA STORAGE DEVICE PERFORMING A SCRAMBLE OPERATION AND OPERATING METHOD THEREOF

(71) Applicant: SK hynix Inc., Gyeonggi-do (KR)

(72) Inventors: Young Gyun Kim, Gyeonggi-do (KR); Tae Hoon Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 46 days.

(21) Appl. No.: 14/657,711

(22) Filed: Mar. 13, 2015

(65) Prior Publication Data

US 2016/0179384 A1 Jun. 23, 2016

(30) Foreign Application Priority Data

Dec. 18, 2014 (KR) .................. 10-2014-0183329

(51) Int. Cl.
| | |
|---|---|
| *G06F 3/06* | (2006.01) |
| *G06F 21/00* | (2013.01) |
| *H04L 9/06* | (2006.01) |
| *H04L 29/06* | (2006.01) |
| *H04L 9/00* | (2006.01) |

(52) U.S. Cl.
CPC .......... *G06F 3/0623* (2013.01); *G06F 3/064* (2013.01); *G06F 3/0604* (2013.01); *G06F 3/0652* (2013.01); *G06F 3/0673* (2013.01); *G06F 3/0679* (2013.01); *G06F 21/00* (2013.01); *H04L 9/008* (2013.01); *H04L 9/06* (2013.01); *H04L 9/0618* (2013.01); *H04L 63/0428* (2013.01); *H04L 63/0435* (2013.01)

(58) Field of Classification Search
None
See application file for complete search history.

(56) References Cited

U.S. PATENT DOCUMENTS

| | | | | |
|---|---|---|---|---|
| 5,996,041 | A * | 11/1999 | Kim ............... | G11C 16/26 365/185.09 |
| 7,362,620 | B2 * | 4/2008 | Yano .............. | G11C 16/10 365/189.05 |
| 7,518,922 | B2 * | 4/2009 | Maejima .......... | G11C 7/02 365/185.17 |
| 7,990,765 | B2 * | 8/2011 | Park .............. | G11C 11/5628 365/185.03 |
| 8,213,603 | B2 * | 7/2012 | Nobukata ......... | H04L 9/003 380/28 |
| 8,341,333 | B2 * | 12/2012 | Takada ............ | G11C 7/1006 711/103 |

(Continued)

FOREIGN PATENT DOCUMENTS

| | | |
|---|---|---|
| KR | 1020100124087 | 11/2010 |
| KR | 1020120125790 | 11/2012 |

OTHER PUBLICATIONS

John Rieman, "Binary Numbers", Apr. 25, 2005, pp. 1-3, https://web.archive.org/web/20050425231107/http://l3d.cs.colorado.edu/courses/CSCI1200-96/binary.html.*

(Continued)

*Primary Examiner* — Christopher D Birkhimer
(74) *Attorney, Agent, or Firm* — IP & T Group LLP

(57) ABSTRACT

A data storage device includes a conversion block suitable for performing a scramble operation on write data, and generating random write data, wherein the scramble operation includes inversion/non-inversion processing and calculation processing based on a random pattern.

20 Claims, 18 Drawing Sheets

(56) References Cited

U.S. PATENT DOCUMENTS

| | | | | |
|---|---|---|---|---|
| 8,429,335 B2* | 4/2013 | Chen | ........................ | G11C 11/56 711/103 |
| 8,578,243 B2* | 11/2013 | Sommer | ............. | G06F 11/1048 713/193 |
| 8,645,794 B1* | 2/2014 | Meir | ........................ | G11C 16/12 365/185.03 |
| 8,713,330 B1* | 4/2014 | Sommer | ............. | G06F 11/1048 713/193 |
| 8,767,459 B1* | 7/2014 | Kasorla | .................. | G11C 16/12 365/184 |
| 8,830,752 B2* | 9/2014 | Fernandes | ........... | G11C 11/5628 365/185.12 |
| 8,862,964 B2* | 10/2014 | Meir | ........................ | G11C 16/12 365/185.03 |
| 8,959,295 B2* | 2/2015 | Moschopoulos | ...... | G11C 16/10 709/203 |
| 2006/0245247 A1* | 11/2006 | Yano | ........................ | G11C 16/10 365/185.08 |
| 2007/0280031 A1* | 12/2007 | Maejima | .................. | G11C 7/02 365/230.06 |
| 2009/0316490 A1* | 12/2009 | Takada | .................. | G11C 7/1006 365/185.26 |
| 2010/0287427 A1* | 11/2010 | Kim | ........................ | G11C 16/10 714/721 |
| 2011/0087838 A1* | 4/2011 | Chen | ........................ | G11C 11/56 711/114 |
| 2012/0278529 A1* | 11/2012 | Hars | ................... | G06F 12/0246 711/103 |
| 2012/0297271 A1* | 11/2012 | Sommer | ............. | G06F 11/1048 714/766 |
| 2013/0279252 A1* | 10/2013 | Fernandes | ........... | G11C 11/5628 365/185.03 |
| 2014/0119089 A1* | 5/2014 | Meir | ................... | G11C 11/5628 365/45 |
| 2014/0281279 A1* | 9/2014 | Oh | ........................ | G06F 3/0655 711/147 |
| 2014/0347924 A1* | 11/2014 | Kasorla | ............... | G11C 11/5628 365/185.03 |
| 2014/0355342 A1* | 12/2014 | Fernandes | ........... | G11C 11/5628 365/185.03 |
| 2015/0063563 A1* | 3/2015 | Vaya | ........................ | G06F 7/72 380/30 |

OTHER PUBLICATIONS

Anonymous, Conversion Table—Decimal, Hexadecimal, Octal, Binary), Apr. 5, 2001, pp. 1-2, https://web.archive.org/web/20010405191756/http://ascii.cl/conversion.htm.*

* cited by examiner

DATA STORAGE DEVICE PERFORMING A SCRAMBLE OPERATION AND OPERATING METHOD THEREOF

CROSS-REFERENCES TO RELATED APPLICATION

The present application claims priority under 35 U.S.C. § 119(a) to Korean application number 10-2014-0183329, filed on Dec. 18, 2014, in the Korean Intellectual Property Office, which is incorporated herein by reference in its entirety.

BACKGROUND

1. Technical Field

Various embodiments generally relate to a data storage device and, more particularly, to a scramble operation of a data storage device.

2. Related Art

A semiconductor memory device may be used to store data. Semiconductor memory devices may be divided into nonvolatile and volatile memory devices.

The nonvolatile memory devices maintain data stored therein even though power is cut off. The nonvolatile memory devices include flash memory devices such as NAND flash or NOR flash, Ferroelectrics Random Access Memory (FeRAM), Phase-Change Random Access Memory (PCRAM), Magnetoresistive Random Access Memory (MRAM) or Resistive Random Access Memory (ReRAM).

Volatile memory devices fail to maintain data stored therein when power is cut off. Volatile memory devices include Static Random Access Memory (SRAM) and Dynamic Random Access Memory (DRAM). Volatile memory devices are generally used as buffer memory devices, cache memory devices, or working memory devices in data processing systems, due to their relatively high processing speed.

SUMMARY

Various embodiments are directed to a data storage device and an operating method thereof, capable of maximizing scrambling effects by performing not only calculation processing using a random pattern but also inversion/non-inversion processing.

In an embodiment, a data storage device may include: a conversion block suitable for performing a scramble operation on write data, and generating random write data, wherein the scramble operation includes inversion/non-inversion processing and calculation processing based on a random pattern.

In an embodiment, a data storage device may include: a conversion block suitable for outputting first random write data by performing a logic operation on write data and a random pattern; and a nonvolatile memory apparatus, the nonvolatile memory apparatus including: an inversion unit suitable for outputting second random write data by inverting/non-inverting the first random write data; and a target memory block suitable for storing the second random write data.

In an embodiment, an operating method of a data storage device may include: generating random write data by performing a scramble operation on write data, the generating including: performing inversion/non-inversion processing; and performing calculation processing based on a random pattern.

In an embodiment, a data storage device may include: a conversion block suitable for performing a scramble operation on write data in response to a flag signal, and generating random write data; a memory apparatus including a plurality of memory blocks, suitable for performing a write operation to write the random write data in a target memory block; and a processor suitable for providing the flag signal to the conversion block based on flag information corresponding to the target memory block.

In an embodiment, an operating method of a data storage device may include: outputting a flag signal based on flag information corresponding to a target memory block; generating random write data by performing a scramble operation on write data in response to the flag signal; and performing a write operation to write the random write data in the target memory block.

DETAILED DESCRIPTION

Figure 1:
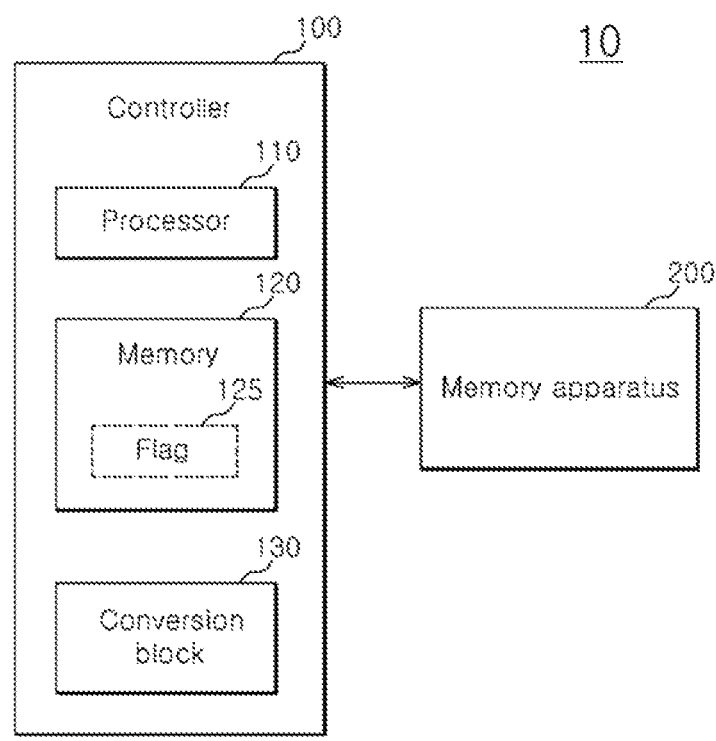
FIG. 1 is a block diagram illustrating a data storage device in accordance with an embodiment of the present invention.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale and, in some instances, proportions may have been exaggerated to more clearly depict certain features of the invention. While particular terminology is used, it is to be appreciated that the terminology used is for describing particular embodiments only and is not intended to limit the scope of the present invention.

FIG. 1 is a block diagram illustrating a data storage device 10 in accordance with an embodiment of the present invention.

Referring to FIG. 1, the data storage device 10 may be configured to store data provided from a host device (not shown), in response to a write request from the host device. Also, the data storage device 10 may be configured to provide stored data to the host device in response to a read request from the host device. The host device may include an electronic device capable of processing data, such as a computer, a digital camera or a mobile phone. The data storage device 10 may operate by being embedded in the host device, or may be fabricated separately and operate when being electrically coupled to the host device.

The data storage device 10 may be configured by a Personal Computer Memory Card International Association (PCMCIA) card, a compact flash (CF) card, a smart media card, a memory stick, a multimedia card (MMC), an embedded MMC (eMMC), a reduced-size multimedia card (RS-MMC) and a micro-size version of MMC (MMC-micro), a secure digital (SD) card, a mini secure digital (mini-SD) and a micro secure digital (micro-SD), a universal flash storage (UFS), or a solid state drive (SSD).

The data storage device 10 may include a controller 100 and a memory apparatus 200.

The controller 100 may include a processor 110, a memory 120, and a conversion block 130.

The processor 110 may control overall operations of the data storage device 10. The processor 110 may control a write operation or a read operation of the memory apparatus 200 in response to a write request or a read request from the host device. The processor 110 may generate commands for controlling the operations of the memory apparatus 200 and provide the generated commands to the memory apparatus 200. The processor 110 may drive a software program for controlling the operation of the data storage device 10, on the memory 120.

The processor 110 may control inversion/non-inversion processing performed in a scramble operation or a descramble operation of the conversion block 130 based on flag information 125. The processor 110 may refer to a flag corresponding to a target memory block of the memory apparatus 200 when the scramble operation or the descramble operation of the conversion block 130 is performed. The target memory block may be a memory block in which scrambled data are to be written, when the scramble operation of the conversion block 130 is performed. The target memory block may be a memory block from which read data to be descrambled are read, when the descramble operation of the conversion block 130 is performed. The processor 110 may provide a flag signal for controlling the inversion/non-inversion processing of the conversion block 130, to the conversion block 130 based on the flag information 125.

The processor 110 may set the flag information 125. The set flag information 125 may be stored in the memory 120. The processor 110 may set flags corresponding to the memory blocks included in the memory apparatus 200, as the flag information 125, based on respective erase counts of the memory blocks. At each time of erasing a memory block and updating an erase count, the processor 110 may newly reset a flag corresponding to the corresponding memory block. The flag corresponding to the target memory block may be constantly retained until the erase count of the target memory block is updated and, accordingly, the processor 110 may control the conversion block 130 to consistently perform the scramble operation and the descramble operation on the same original data.

The memory 120 may serve as a working memory, a buffer memory, or a cache memory of the processor 110. The memory 120 may serve as the working memory that stores various program data and software programs driven by the processor 110. The memory 120 may serve as the buffer memory that buffers data transmitted between the host device and the memory apparatus 200. The memory 120 may serve as the cache memory that temporarily stores cache data.

The conversion block 130 may perform the scramble operation on original data to be stored in the memory apparatus 200, and provide the scrambled data to the memory apparatus 200. As the memory apparatus 200 stores the data scrambled by the conversion block 130, deformation of data due to a disturbance phenomenon among memory cells and degradation of memory cells due to repetitive storage of a specific data pattern may be suppressed. The conversion block 130 may recover the original data by performing the descramble operation on the scrambled data read from the memory apparatus 200.

The scramble operation of the conversion block 130 on the original data may include inversion/non-inversion processing and calculation processing using a random pattern. The conversion block 130 may perform the scramble operation on the original data by the inversion/non-inversion processing and the calculation processing using the random pattern. In the embodiment, as the conversion block 130 performs not only the calculation processing using the random pattern but also the inversion/non-inversion processing, the scrambling effect on the original data may be maximized. The conversion block 130 may perform the inversion/non-inversion processing in response to the flag signal.

The descramble operation of the conversion block 130 on the scrambled data read from the memory apparatus 200 may include inversion/non-inversion processing and calculation processing using a random pattern. The conversion block 130 may perform the descramble operation on the scrambled data by the inversion/non-inversion processing and the calculation processing using the random pattern. The descramble operation for recovering the original data may be performed by an inverse calculation of the scramble operation performed on the corresponding original data.

The data storage device 10 of FIG. 1 may include the conversion block 130, which is configured to perform both the scramble operation and the descramble operation, as described above. According to an embodiment, the data storage device 10 may be implemented with a scrambler, which performs a scramble operation, and a descrambler, which performs a descramble operation.

The memory apparatus 200 may include a nonvolatile memory apparatus. For example, the memory apparatus 200 may be a flash memory apparatus such as a NAND flash or a NOR flash, a ferroelectric random access memory (Fe-RAM), a phase change random access memory (PCRAM), a magnetic random access memory (MRAM) or a resistive random access memory (ReRAM). The memory apparatus 200 may store data under the control of the processor 110. While it is illustrated in FIG. 1 that the data storage device 10 includes one memory apparatus 200, it is to be noted that the number of memory apparatuses included in the data storage device 10 is not specifically limited.

Figure 2:
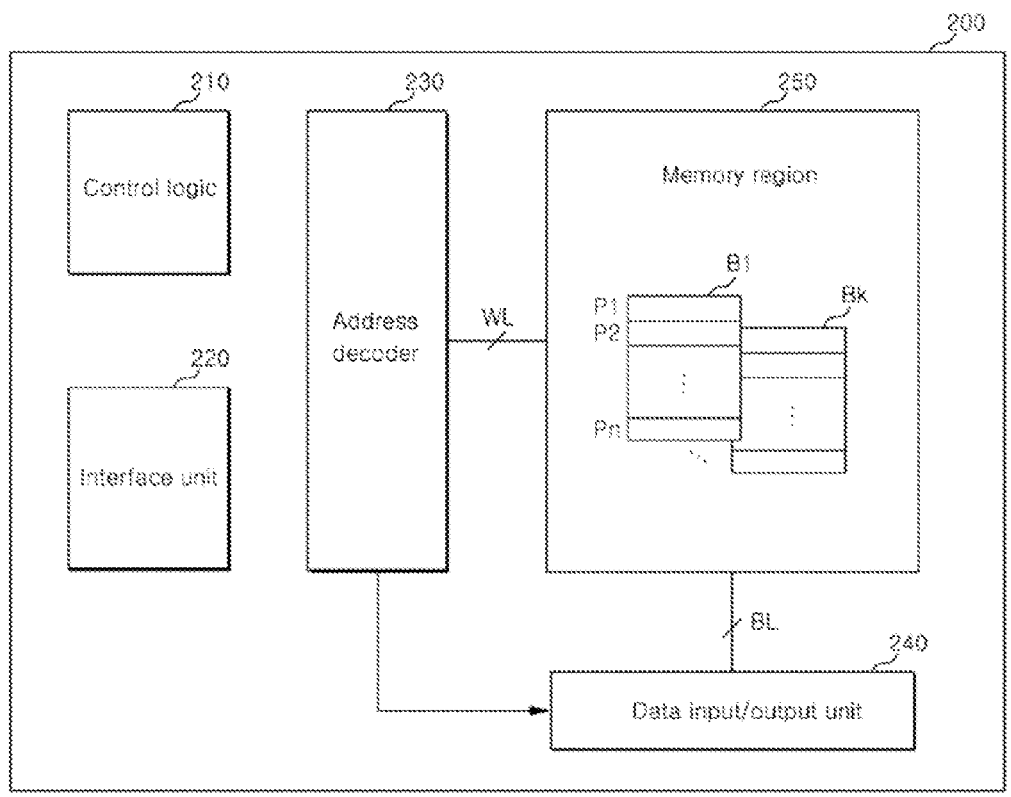
FIG. 2 is a block diagram illustrating a memory apparatus shown in FIG. 1.

FIG. 2 is a block diagram illustrating the memory apparatus 200 shown in FIG. 1.

Referring to FIG. 2, the memory apparatus 200 may include a control logic 210, an interface unit 220, an address decoder 230, a data input/output unit 240, and a memory region 250.

The control logic 210 may control the overall operations of the memory apparatus 200 such as a write operation, a read operation and an erase operation, in response to the commands provided from the controller 100.

The interface unit 220 may exchange various control signals including commands and addresses and data with the controller 100. The interface unit 220 may transmit the various control signals and the data inputted thereto, to internal units of the memory apparatus 200.

The address decoder 230 may decode row addresses and column addresses transmitted thereto. The address decoder 230 may control word lines WL to be selectively driven in response to the decoded row addresses. The address decoder 230 may control the data input/output unit 240 such that bit lines BL are selectively driven in response to the decoded column addresses.

The data input/output unit 240 may transmit the data transmitted from the interface unit 220 to the memory region 250 through the bit lines BL. The data input/output unit 240 may transmit the data read through the bit lines BL from the memory region 250, to the interface unit 220.

The memory region 250 may be electrically coupled with the address decoder 230 through the word lines WL, and may be electrically coupled with the data input/output unit 240 through the bit lines BL. The memory region 250 may include a memory cell array of, for example, a three-dimensional structure.

The memory region 250 may include a plurality of memory cells which are respectively disposed at areas where the word lines WL and the bit lines BL cross each other. The memory cells may be classified according to the number of data bits stored in each memory cell. For example, the memory cells may be classified into single level cells, each of which stores 1 bit, and multi-level cells, each of which stores at least 2 bits.

The memory region 250 may include a plurality of memory blocks B1 to Bk. Each of the memory blocks B1 to Bk may include a plurality of pages, for example, P1 to Pn. The pages P1 to Pn may be classified according to the data stored in memory cells when the memory cells are multi-level cells. For example, when memory cells are multi-level cells, each storing 2 bits, the pages P1 to Pn may be classified into least significant bit (LSB) pages and most significant bit (MSB) pages.

The memory apparatus 200 may perform the erase operation in units of memory blocks. The memory apparatus 200 may perform the write operation or the read operation in the unit of a page.

Figure 3:
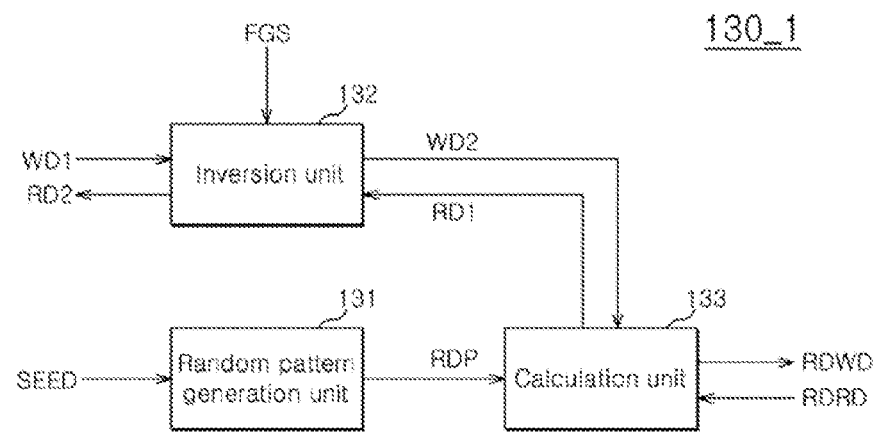
FIG. 3 is a block diagram illustrating an exemplary embodiment of a conversion block shown in FIG. 1.

FIG. 3 is a block diagram illustrating an exemplary embodiment of the conversion block 130 shown in FIG. 1.

Referring to FIG. 3, the conversion block 130_1 may receive original data as first write data WD1, perform a scramble operation on the first write data WD1, and output the scrambled first write data WD1 as random write data RDWD. The random write data RDWD may be written in the memory apparatus 200, and be read as random read data RDRD from the memory apparatus 200. The conversion block 130_1 may receive the random read data RDRD read from the memory apparatus 200, perform a descramble operation on the random read data RDRD, and output the descrambled random read data RDRD as second read data RD2.

The conversion block 130_1 may include a random pattern generation unit 131, an inversion unit 132, and a calculation unit 133.

The random pattern generation unit 131 may receive seed data SEED, and output a random pattern RDP based on the seed data SEED. In the scramble operation, the seed data SEED may be selected in response to an address of a target page of a target memory block in which the random write data RDWD are to be written. In the descramble operation, the seed data SEED may be selected in response to an address of a target page of a target memory block from which the random read data RDRD are read. The random pattern generation unit 131 may receive the same seed data SEED in the scramble operation and the descramble operation for the same target page and, accordingly, output the same random pattern RDP. The random pattern generation unit 131 may be configured by, for example, a linear feedback shift register.

In the scramble operation, the inversion unit 132 may receive the first write data WD1, invert/non-invert the first write data WD1 based on a flag signal FGS, and output second write data WD2 to the calculation unit 133. When the flag signal FGS is enabled, the inversion unit 132 may invert the first write data WD1 and output the inverted first write data WD1 as the second write data WD2. When the flag signal FGS is disabled, the inversion unit 132 may non-invert the first write data WD1 and output the non-inverted first write data WD1 as the second write data WD2.

In the descramble operation, the inversion unit 132 may receive first read data RD1 from the calculation unit 133, invert/non-invert the first read data RD1 based on the flag signal FGS, and output the second read data RD2. When the flag signal FGS is enabled, the inversion unit 132 may invert the first read data RD1 and output the inverted first read data RD1 as the second read data RD2. The inversion unit 132 may non-invert the first read data RD1 based on the disabled flag signal FGS, and output the non-inverted first read data RD1 as the second read data RD2.

In the scramble operation, the calculation unit 133 may perform a logic operation on the second write data WD2 and the random pattern RDP, and output the random write data RDWD. In the descramble operation, the calculation unit 133 may perform a logic operation on the random read data RDRD and the random pattern RDP, and output the first read data RD1. The logic operation may be, for example, an exclusive OR logic operation.

Figure 4:
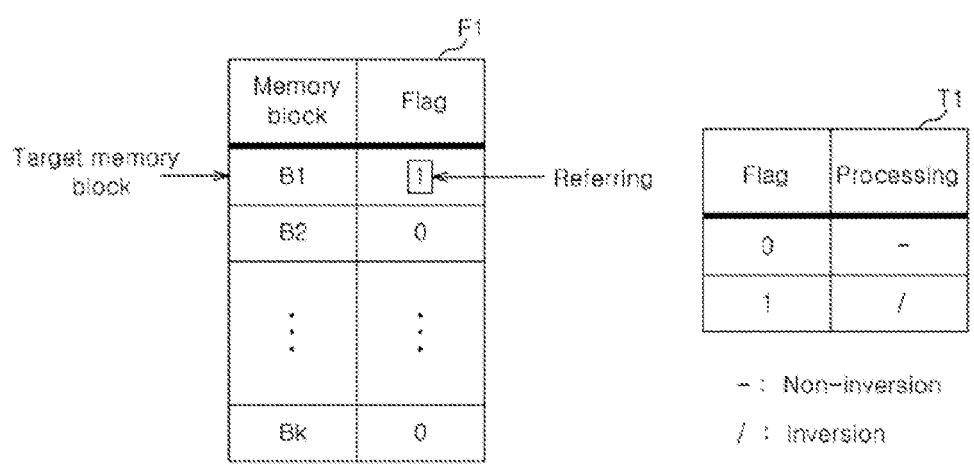
FIG. 4 shows flags set in correspondence to memory blocks and a table explaining inversion/non-inversion processing of the conversion block shown in FIG. 3 according to the flags.

FIG. 4 shows the flags F1 set in correspondence to the memory blocks B1 to Bk and a table T1 explaining the inversion/non-inversion processing of the conversion block 130_1 shown in FIG. 3 according to the flags F1.

Referring to FIG. 4, the processor 110 may set the flags F1 corresponding to the memory blocks B1 to Bk Included in the memory apparatus 200. The processor 110 may set the flags F1 corresponding to the memory blocks B1 to Bk, based on the erase counts of the respective memory blocks B1 to Bk. According to an embodiment, the processor 110 may set a flag of 1 bit, corresponding to each of the memory blocks B1 to Bk. For example, the processor 110 may set a remainder when dividing the erase count of a memory block by 2, as a flag corresponding to the memory block.

At each erasing of the memory block and updating of the erase count, the processor 110 may reset the flag corresponding to the memory block. The flag corresponding to the target memory block may be retained until the erase count of the target memory block is updated and, accordingly, the processor 110 may control the conversion block 130 to consistently perform the scramble operation and the descramble operation on the same original data. Since a corresponding flag is reset each time a memory block is erased, even though the conversion block 130_1 receives the same original data before and after the erase of the target memory block, the inversion/non-inversion processing may be performed differently in response to the flag. Hence, the scrambling effect may be maximized.

In the scramble operation of the conversion block 130_1, the processor 110 may refer to the set value of the flag corresponding to the target memory block in which the random write data RDWD are to be written. In the descramble operation of the conversion block 130_1, the processor 110 may refer to the set value of the flag corresponding to the target memory block from which the random read data RDRD are read. The processor 110 may transmit the flag signal FGS to the conversion block 130_1 in response to the referred flag. For example, the processor 110 may disable the flag signal FGS when the referred flag is "0". For example, the processor 110 may enable the flag signal FGS when the referred flag is "1".

In the scramble operation and descramble operation, the inversion unit 132 may invert/non-invert the first write data WD1 and the first read data RD1 inputted thereto, based on the flag signal FGS. For example, the inversion unit 132 may non-invert the first write data WD1 and the first read data RD1 inputted thereto, when the flag signal FGS is disabled. For example, the inversion unit 132 may invert the first write data WD1 and the first read data RD1 inputted thereto, when the flag signal FGS is enabled.

In summary, when the flag corresponding to the target memory block is set to "0", the first write data WD1 and the first read data RD1 inputted to the inversion unit 132 may be non-inverted. When the flag corresponding to the target memory block is set to "1", the first write data WD1 and the first read data RD1 inputted to the inversion unit 132 may be inverted.

Figure 5:
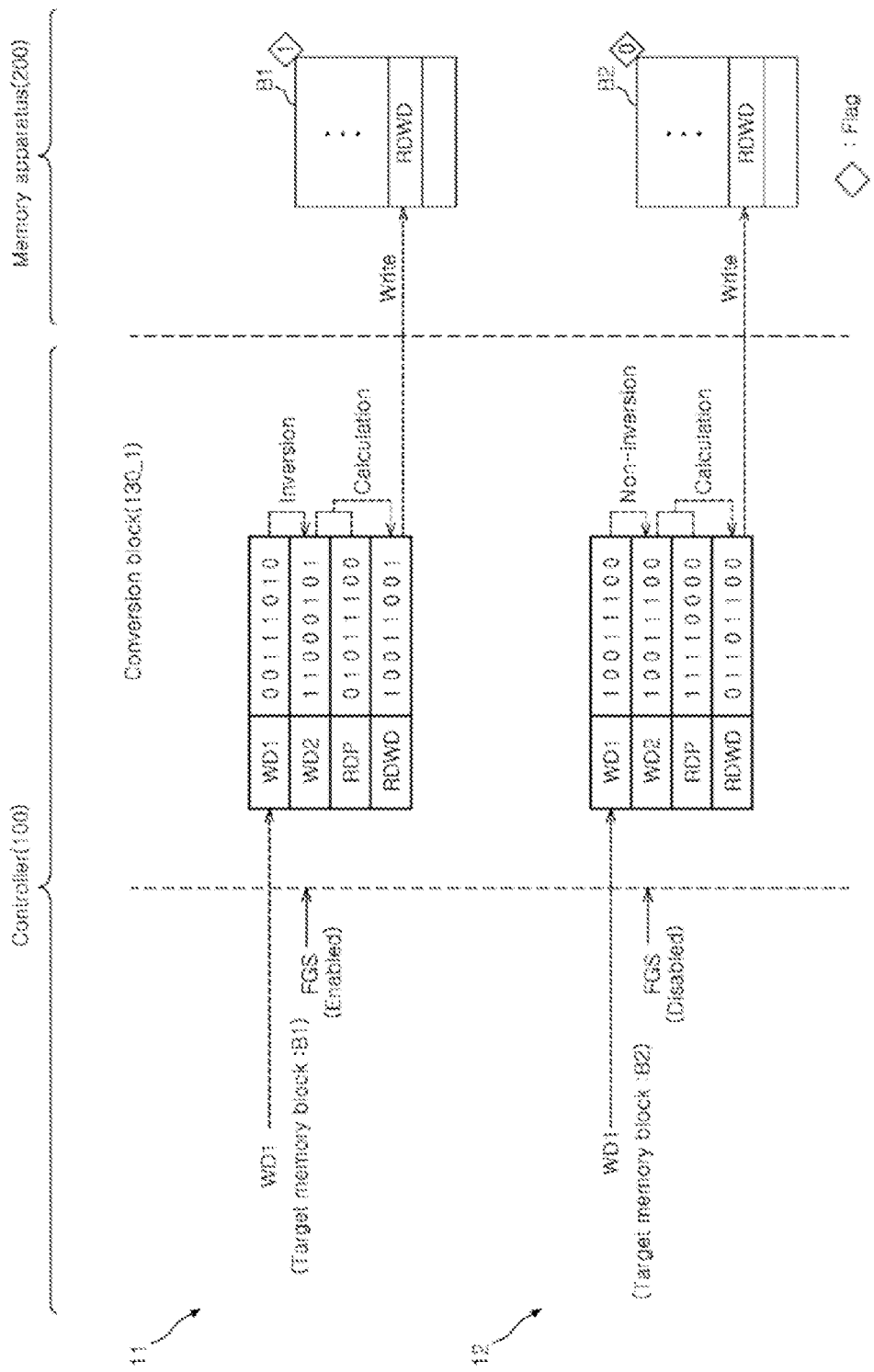
FIG. 5 is a diagram explaining a scramble operation of the conversion block shown in FIG. 3.
Figure 6:
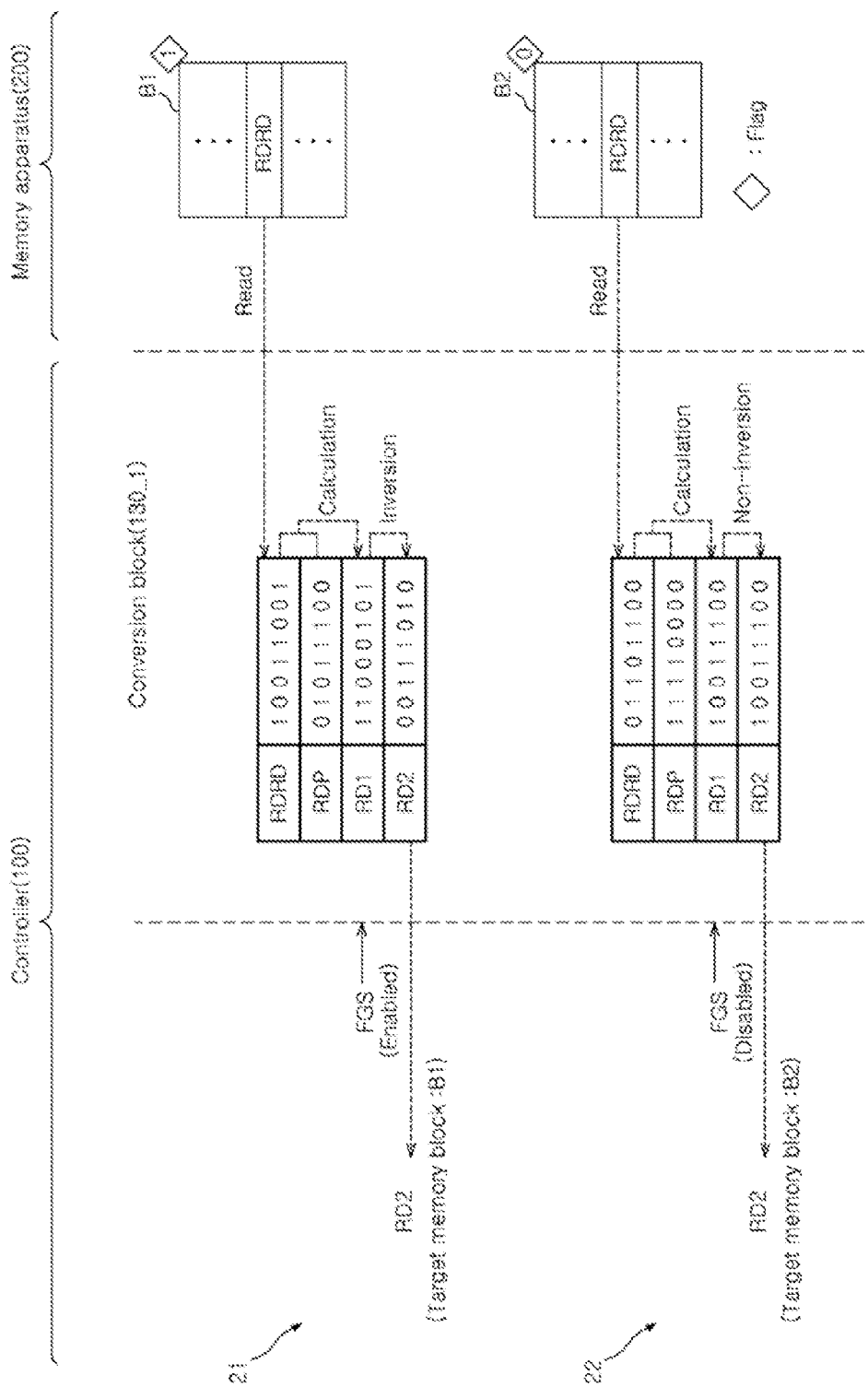
FIG. 6 is a diagram explaining a descramble operation of the conversion block shown in FIG. 3.

FIG. 5 is a diagram explaining the scramble operation of the conversion block 130_1 shown in FIG. 3. FIG. 6 is a diagram explaining the descramble operation of the conversion block 130_1 shown in FIG. 3.

Referring to FIGS. 5 and 6, it is assumed that a flag corresponding to the first memory block B1 of the memory apparatus 200 is set to "1" and a flag corresponding to the second memory block B2 of the memory apparatus 200 is set to "0". In FIGS. 5 and 6, it is assumed that inversion/non-inversion processing is performed in response to a flag set to 1 bit as described above with reference to FIG. 4.

Hereinbelow, the scramble operation of the conversion block 130_1 will be described in detail with reference to FIGS. 3 to 5.

In the upper example 11 and the lower example 12, the conversion block 130_1 may receive original data, that is, the first write data WD1, scramble the first write data WD1, and output the random write data RDWD. A target memory block of the memory apparatus 200 in which the random write data RDWD are to be written may be the first memory block B1 in the upper example 11 and the second memory block B2 in the lower example 12.

In the upper example 11, the inversion unit 132 may receive the first write data WD1. The inversion unit 132 may receive the enabled flag signal FGS based on the flag "1" corresponding to the first memory block B1. The inversion unit 132 may invert the first write data WD1 based on the flag signal FGS, and output the inverted first write data WD1 as the second write data WD2. The random pattern generation unit 131 may output the random pattern RDP. The calculation unit 133 may perform a logic operation, for example, an exclusive OR logic operation, on the second write data WD2 and the random pattern RDP, and output the random write data RDWD. The outputted random write data RDWD may be transmitted to the memory apparatus 200, and be written in the first memory block B1.

In the lower example 12, the inversion unit 132 may receive the first write data WD1. The inversion unit 132 may receive the disabled flag signal FGS based on the flag "0" corresponding to the second memory block B2. The inversion unit 132 may non-invert the first write data WD1 based on the flag signal FGS, and output the non-inverted first write data WD1 as the second write data WD2. The random pattern generation unit 131 may output the random pattern RDP. The calculation unit 133 may perform a logic operation, for example, an exclusive OR logic operation, on the second write data WD2 and the random pattern RDP, and output the random write data RDWD. The outputted random write data RDWD may be transmitted to the memory apparatus 200, and be written in the second memory block B2.

Hereinbelow, the descramble operation of the conversion block 130_1 will be described in detail with reference to FIGS. 3, 4 and 6.

In the upper example 21 and the lower example 22, the conversion block 130_1 may receive scrambled data, that is, the random read data RDRD, descramble the random read data RDRD, and output original data, that is, the second read data RD2. A target memory block of the memory apparatus 200 from which the random read data RDRD are read may be the first memory block B1 in the upper example 21 and the second memory block B2 in the lower example 22.

In the upper example 21, the calculation unit 133 may receive the random read data RDRD. The random pattern generation unit 131 may output the random pattern RDP. The calculation unit 133 may perform a logic operation, for example, an exclusive OR logic operation, on the random read data RDRD and the random pattern RDP, and output the first read data RD1. The inversion unit 132 may receive the enabled flag signal FGS based on the flag "1" corresponding to the first memory block B1. The inversion unit 132 may invert the first read data RD1 based on the flag signal FGS, and output the inverted first read data RD1 as the second read data RD2.

In the lower example 22, the inversion unit 132 may receive the disabled flag signal FGS based on the flag "0" corresponding to the second memory block B2. The inversion unit 132 may non-invert the first read data RD1 based on the flag signal FGS, and output the non-inverted first read data RD1 as the second read data RD2.

Figure 7:
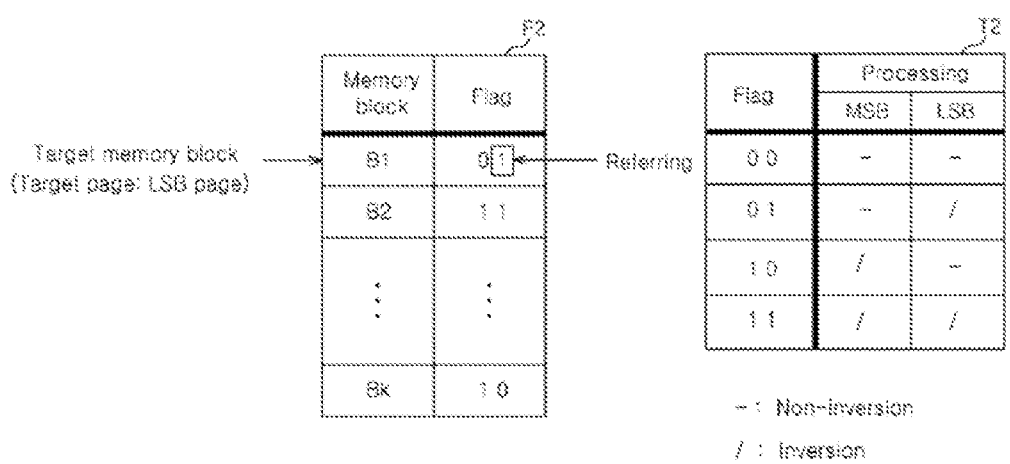
FIG. 7 shows flags set in correspondence to memory blocks and a table explaining inversion/non-inversion processing of the conversion block shown in FIG. 3 according to the flags.

FIG. 7 shows flags F2 set in correspondence to the memory blocks B1 to Bk and a table T2 explaining the inversion/non-inversion processing of the conversion block 130_1 shown in FIG. 3 according to the flags F2.

Referring FIG. 7, the processor 110 may set the flag F2 of 2 bits corresponding to each of the memory blocks B1 to Bk. For example, the processor 110 may set a remainder when dividing the erase count of a memory block by 4, as a flag corresponding to the memory block.

A least significant bit in the 2-bit flag F2 corresponding to a certain memory block may correspond to a first page group of the memory block, and a most significant bit may correspond to a second page group of the memory block. For example, when pages are divided into LSB pages and MSB pages, the least significant bit in the 2-bit flag corresponding to the memory block may correspond to the LSB pages, and the most significant bit may correspond to the MSB pages.

In the scramble operation of the conversion block 130_1, the processor 110 may refer to a set value of a flag corresponding to a target page of a target memory block in which the random write data RDWD are to be written. In the descramble operation of the conversion block 130_1, the processor 110 may refer to a set value of a flag corresponding to a target memory block from which the random read data RDRD are read. For example, when the target page is an LSB page, the processor 110 may refer to the least significant bit of the flag corresponding to the target memory block. For example, when the target page is an MSB page, the processor 110 may refer to the most significant bit of the flag corresponding to the target memory block.

The processor 110 may transmit the flag signal FGS to the conversion block 130_1 in response to the referred flag. The inversion unit 132 may perform inversion/non-inversion processing based on the flag signal FGS.

Summarizing, when the flag corresponding to the target memory block is set to "00", the first write data WD1 and the first read data RD1 inputted to the inversion unit 132 may be non-inverted regardless of whether they are LSB data or MSB data. When the flag corresponding to the target memory block is set to "01", the first write data WD1 and the first read data RD1 inputted to the inversion unit 132 may be inverted only when they are LSB data. When the flag corresponding to the target memory block is set to "10", the first write data WD1 and the first read data RD1 inputted to the inversion unit 132 may be inverted only when they are MSB data. When the flag corresponding to the target memory block is set to "11", the first write data WD1 and the first read data RD1 inputted to the inversion unit 132 may be inverted regardless of whether they are LSB data or MSB data.

Figure 8:
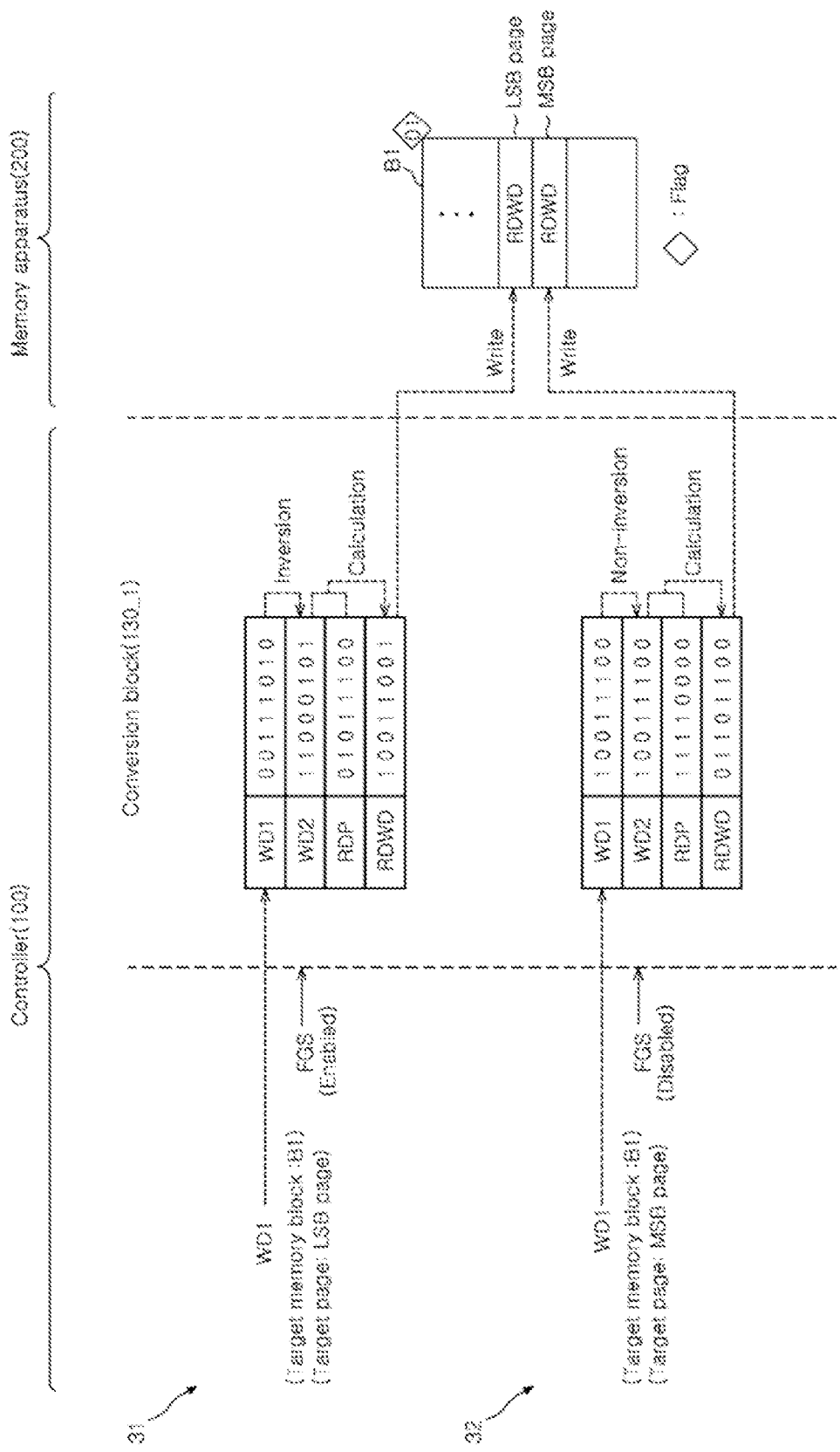
FIG. 8 is a diagram explaining a scramble operation of the conversion block shown in FIG. 3.

FIG. 8 is a diagram explaining the scramble operation of the conversion block 130_1 shown in FIG. 3.

Referring to FIG. 8, it is assumed that a flag corresponding to the first memory block B1 of the memory apparatus 200 is set to "01". In FIG. 8, it is assumed that inversion/non-inversion processing is performed in response to a flag set to 2 bits as described above with reference to FIG. 7.

Hereinbelow, the scramble operation of the conversion block 130_1 will be described in detail with reference to FIGS. 3, 7 and 8.

In the upper Example 31 and the lower Example 32, the conversion block 130_1 may receive original data, that is, the first write data WD1, scramble the first write data WD1, and output the random write data RDWD. In the upper Example 31, a target memory block of the memory apparatus 200 in which the random write data RDWD are to be written may be the first memory block B1, and a target page may be an LSB page. In the lower Example 32, a target memory block may be the first memory block B1, and a target page may be an MSB page.

In the upper Example 31, the inversion unit 132 may receive the first write data WD1. The inversion unit 132 may receive the enabled flag signal FGS based on the least significant bit "1" of the flag corresponding to the first memory block B1. The inversion unit 132 may invert the first write data WD1 based on the flag signal FGS, and output the inverted first write data WD1 as the second write data WD2. The random pattern generation unit 131 may output the random pattern RDP. The calculation unit 133 may perform a logic operation, for example, an exclusive OR logic operation, on the second write data WD2 and the random pattern RDP, and output the random write data RDWD. The outputted random write data RDWD may be transmitted to the memory apparatus 200, and be written in the LSB page of the first memory block B1.

In the lower Example 32, the inversion unit 132 may receive the disabled flag signal FGS based on the most significant bit "0" of the flag corresponding to the first memory block B1. The inversion unit 132 may non-invert the first write data WD1 based on the flag signal FGS, and output the non-inverted first write data WD1 as the second write data WD2. The random pattern generation unit 131 may output the random pattern RDP. The calculation unit 133 may perform a logic operation, for example, an exclusive OR logic operation, on the second write data WD2 and the random pattern RDP, and output the random write data RDWD. The outputted random write data RDWD may be transmitted to the memory apparatus 200, and be written in the MSB page of the first memory block B1.

According to an embodiment, the processor 110 may set a flag of i bits in correspondence to each of the memory blocks B1 to Bk, where i is a natural number greater than 1. For example, the processor 110 may set a remainder when dividing the erase count of a memory block by $2^i$, as a flag corresponding to the memory block. In an i-bit flag corresponding to a certain memory block, respective bits may correspond to the different page groups of the corresponding memory block. In the scramble operation and the descramble operation of the conversion block 130, the processor 110 may refer to a bit corresponding to a target page in the i-bit flag corresponding to the target memory block, and enable/disable the flag signal FGS.

Figure 9:
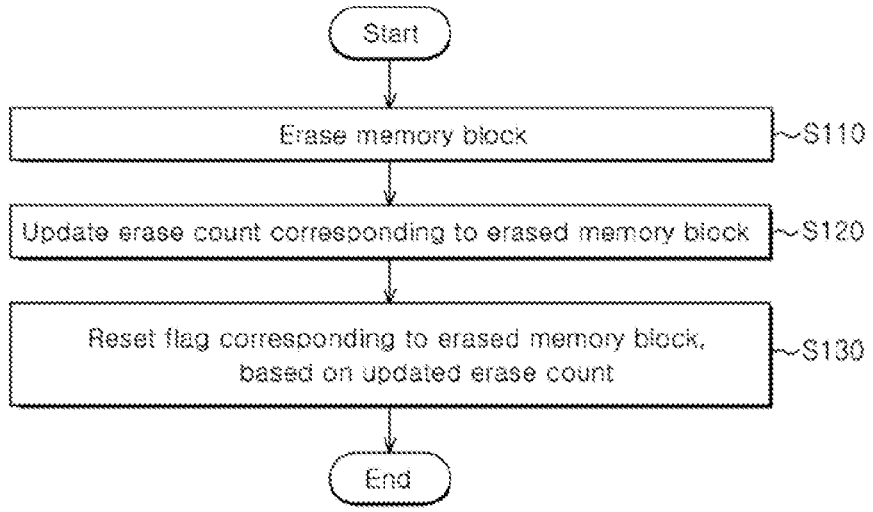
FIG. 9 is a flow chart explaining an operating method of the data storage device shown in FIG. 1.

FIG. 9 is a flow chart explaining an operating method of the data storage device 10 shown in FIG. 1.

Hereinbelow, the operating method of the data storage device 10 will be described in detail with reference to FIGS. 1 and 9.

Referring to FIG. 9, at step S110, the processor 110 may control an erase operation on a memory block of the memory apparatus 200.

At step S120, the processor 110 may update an erase count corresponding to the erased memory block.

At step S130, the processor 110 may reset a flag corresponding to the erased memory block based on the updated erase count.

Figure 10:
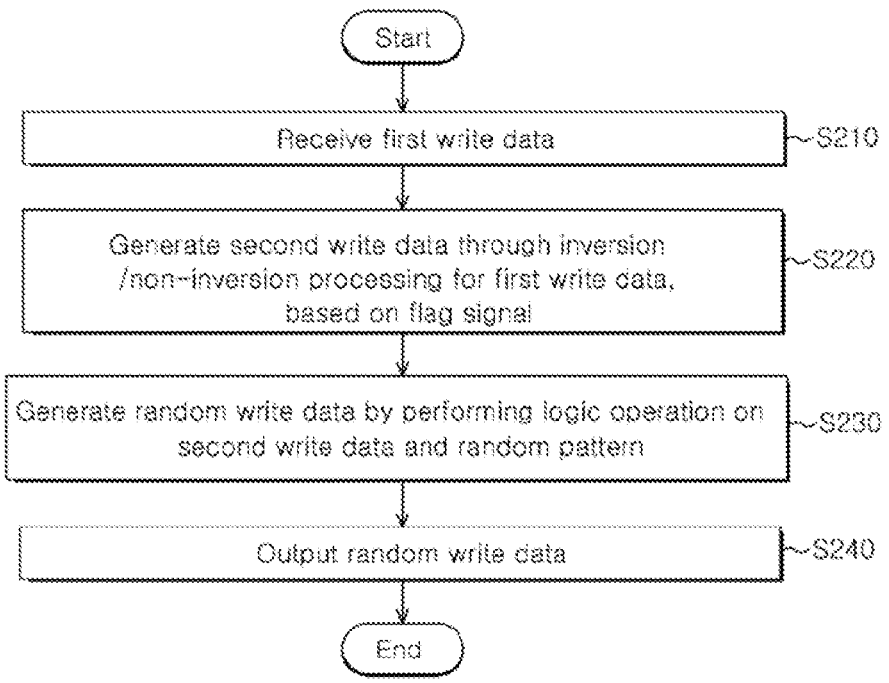
FIG. 10 is a flow chart explaining an operating method of the conversion block shown in FIG. 3.

FIG. 10 is a flow chart explaining an operating method of the conversion block 130_1 shown in FIG. 3.

Hereinbelow, the scramble operation of the conversion block 130_1 will be described in detail with reference to FIGS. 3 and 10.

Referring to FIG. 10, at step S210, the conversion block 130_1 may receive the first write data WD1.

At step S220, the inversion unit 132 may generate the second write data WD2 through inversion/non-inversion processing for the first write data WD1, based on the flag signal FGS.

At step S230, the calculation unit 133 may generate the random write data RDWD by performing a logic operation on the second write data WD2 and the random pattern RDP.

At step S240, the conversion block 130_1 may output the random write data RDWD.

Figure 11:
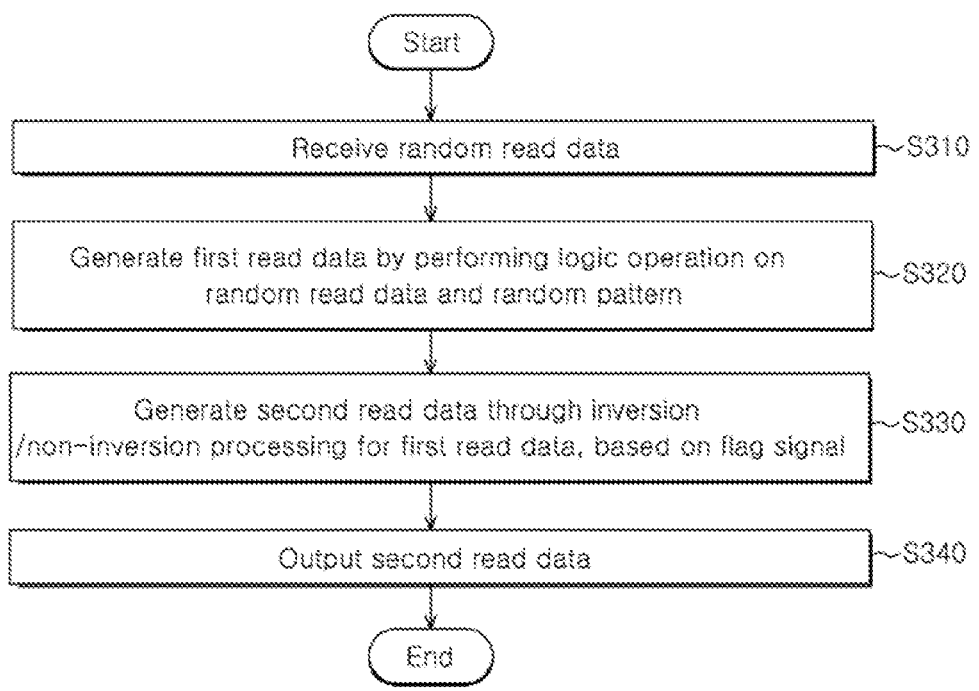
FIG. 11 is a flow chart explaining an operating method of the conversion block shown in FIG. 3.

FIG. 11 is a flow chart explaining an operating method of the conversion block 130_1 shown in FIG. 3.

Hereinbelow, the descramble operation of the conversion block 130_1 will be described in detail with reference to FIGS. 3 and 11.

Referring to FIG. 11, at step S310, the conversion block 130_1 may receive the random read data RDRD.

At step S320, the calculation unit 133 may generate the first read data RD1 by performing a logic operation on the random read data RDRD and the random pattern RDP.

At step S330, the inversion unit 132 may generate the second read data RD2 through inversion/non-inversion processing for the first read data RD1 based on the flag signal FGS.

At step S340, the conversion block 130_1 may output the second read data RD2.

Figure 12:
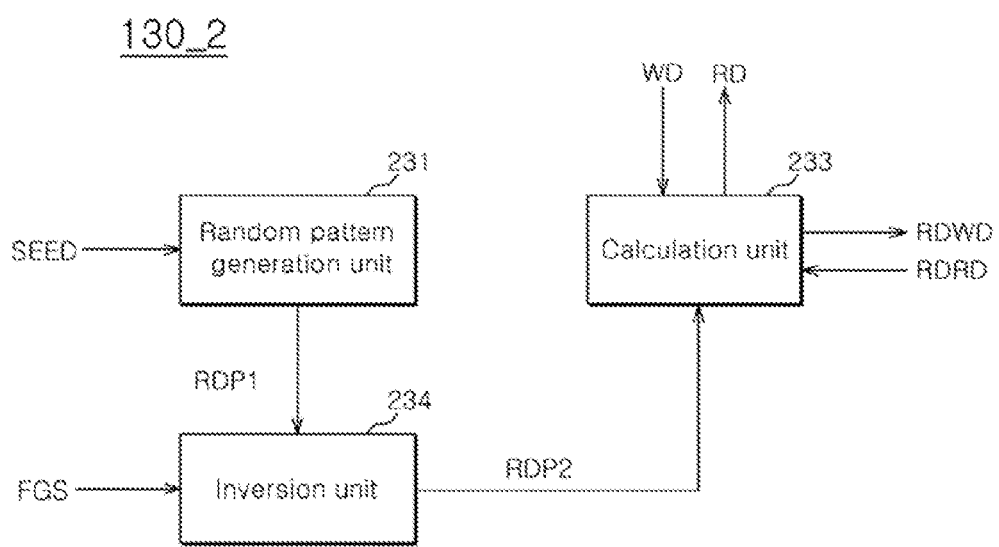
FIG. 12 is a block diagram illustrating an exemplary embodiment of a conversion block shown in FIG. 1.

FIG. 12 is a block diagram illustrating an exemplary embodiment of the conversion block 130 shown in FIG. 1.

Referring to FIG. 12, the conversion block 130_2 may receive write data WD, perform a scramble operation on the write data WD, and output the scrambled write data WD as random write data RDWD. The random write data RDWD may be written in the memory apparatus 200, and be read as random read data RDRD from the memory apparatus 200. The conversion block 130_2 may receive the random read data RDRD read from the memory apparatus 200, perform a descramble operation on the random read data RDRD, and output the descrambled random read data RDRD as read data RD.

The conversion block 130_2 may include a random pattern generation unit 231, a calculation unit 233, and an inversion unit 234. Unlike the conversion block 130_1 of FIG. 3, in the conversion block 130_2, the inversion unit 234 may invert a first random pattern RDP1 in response to a flag signal FGS.

The random pattern generation unit 231 may receive a seed data SEED, and output the first random pattern RDP1 based on the seed data SEED. The random pattern generation unit 231 may be configured and operate in substantially the same way as the random pattern generation unit 131 of FIG. 3.

The inversion unit 234 may receive the first random pattern RDP1, invert/non-invert the first random pattern RDP1 based on the flag signal FGS, and output a second random pattern RDP2. The inversion unit 234 may invert the first random pattern RDP1 when the flag signal FGS is enabled, and output the inverted first random pattern RDP1 as the second random pattern RDP2. The inversion unit 234 may non-invert the first random pattern RDP1 when the flag signal FGS is disabled, and output the non-inverted first random pattern RDP1 as the second random pattern RDP2.

In the scramble operation, the calculation unit 233 may perform a logic operation on the write data WD and the second random pattern RDP2, and output the random write data RDWD. In the descramble operation, the calculation unit 233 may perform a logic operation on the random read data RDRD and the second random pattern RDP2, and output the read data RD. The logic operation of the calculation unit 233 may be, for example, an exclusive OR logic operation.

Figure 13:
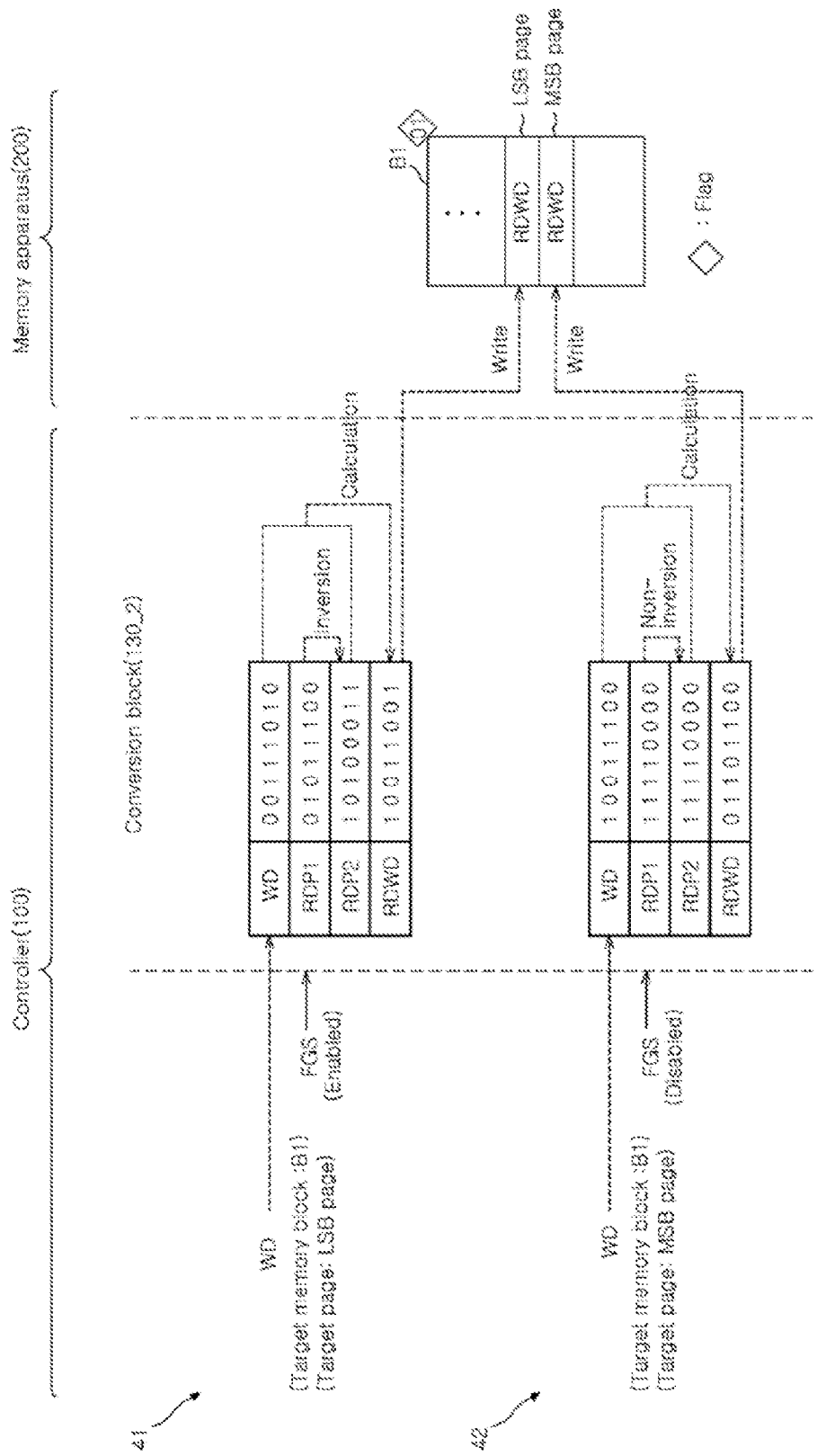
FIG. 13 is a diagram explaining a scramble operation of the conversion block shown in FIG. 12.
Figure 14:
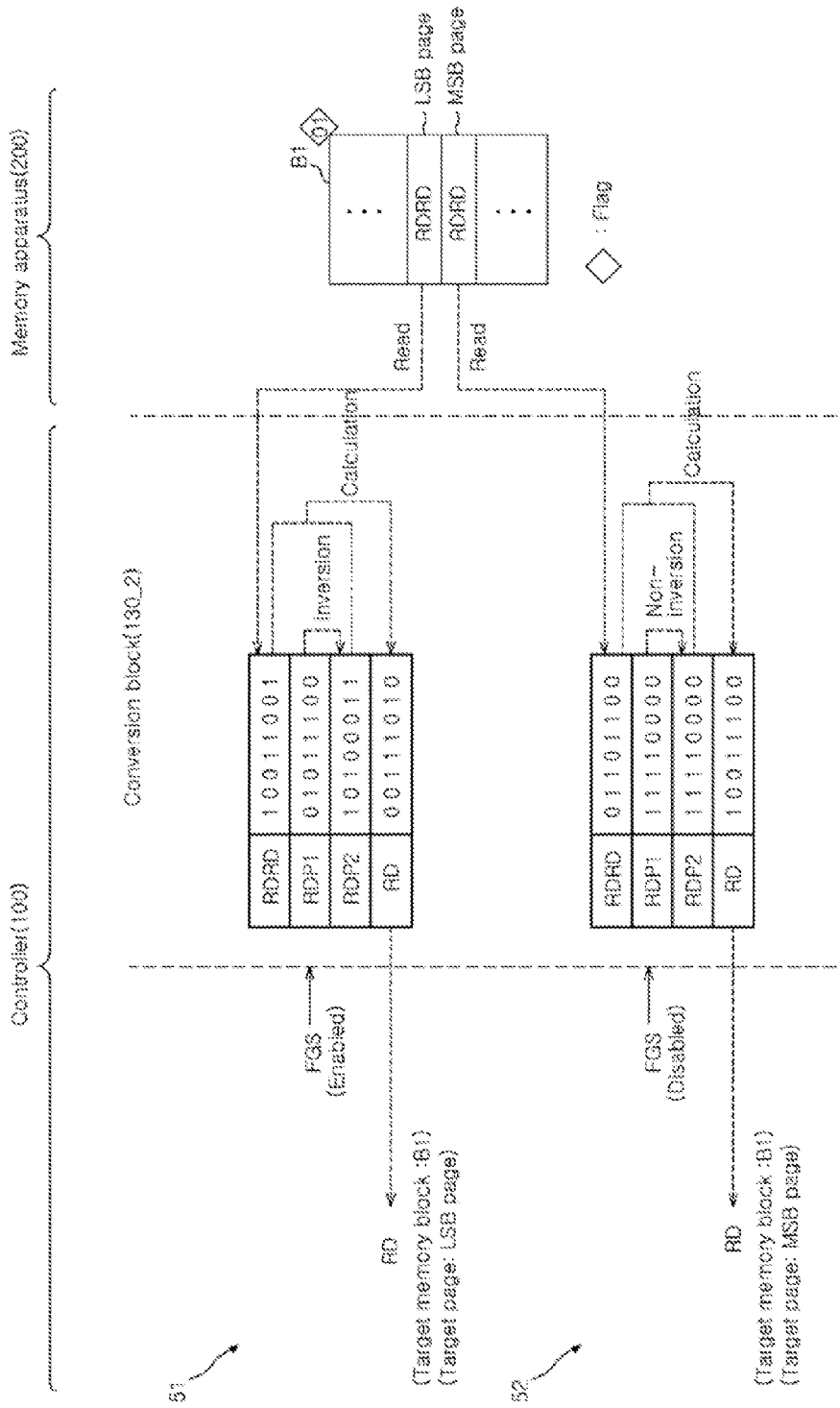
FIG. 14 is a diagram explaining a descramble operation of the conversion block shown in FIG. 12.

FIG. 13 is a diagram explaining the scramble operation of the conversion block 130_2 shown in FIG. 12. FIG. 14 is a diagram explaining the descramble operation of the conversion block 130_2 shown in FIG. 12.

Referring to FIGS. 13 and 14, it is assumed that a flag corresponding to the first memory block B1 of the memory apparatus 200 is set to "01".

In FIGS. 13 and 14, it is assumed that inversion/non-inversion processing is performed in response to a flag set to 2 bits as described above with reference to FIG. 7. That is, when a target page is an LSB page, the processor 110 may output the flag signal FGS by referring to the least significant bit of the flag corresponding to a target memory block. When a target page is an MSB page, the processor 110 may output the flag signal FGS by referring to the most significant bit of the flag corresponding to a target memory block.

Hereinbelow, the scramble operation of the conversion block 130_2 will be described in detail with reference to FIGS. 12 and 13.

In the upper Example 41 and the lower Example 42, the conversion block 130_2 may receive the write data WD, scramble the write data WD, and output the random write data RDWD. A target memory block of the memory apparatus 200 in which the random write data RDWD are to be written may be the first memory block B1. A target page may be an LSB page in the upper Example 41 and an MSB page in the lower Example 42.

In the upper Example 41, the calculation unit 233 may receive the write data WD. The random pattern generation unit 231 may output the first random pattern RDP1. The inversion unit 234 may receive the enabled flag signal FGS based on the least significant bit "1" of the flag corresponding to the first memory block B1. The inversion unit 234 may invert the first random pattern RDP1 based on the flag signal FGS, and output the inverted first random pattern RDP1 as the second random pattern RDP2. The calculation unit 233 may perform a logic operation, for example, an exclusive OR logic operation, on the write data WD and the second random pattern RDP2, and output the random write data RDWD. The outputted random write data RDWD may be transmitted to the memory apparatus 200, and be written in the LSB page of the first memory block B1.

In the lower Example 42, the inversion unit 234 may receive the disabled flag signal FGS based on the most significant bit "0" of the flag corresponding to the first memory block B1. The inversion unit 234 may non-invert the first random pattern RDP1 based on the flag signal FGS, and output the non-inverted first random pattern RDP1 as the second random pattern RDP2. The calculation unit 233 may perform a logic operation, for example, an exclusive OR logic operation, on the write data WD and the second random pattern RDP2, and output the random write data RDWD. The outputted random write data RDWD may be transmitted to the memory apparatus 200, and be written in the MSB page of the first memory block B1.

Hereinbelow, the descramble operation of the conversion block 130_2 will be described in detail with reference to FIGS. 12 and 14.

In the upper Example 51 and the lower Example 52, the conversion block 130_2 may receive scrambled data, that is, the random read data RDRD, descramble the random read data RDRD, and output original data, that is, the read data RD. A target memory block of the memory apparatus 200 from which the random read data RDRD are read may be the first memory block B1. A target page may be an LSB page in the upper Example 51 and an MSB page in the lower Example 52.

In the upper Example 51, the calculation unit 233 may receive the random read data RDRD. The random pattern generation unit 231 may output the first random pattern RDP1. The inversion unit 234 may receive the enabled flag signal FGS based on the least significant bit "1" of the flag corresponding to the first memory block B1. The inversion unit 234 may invert the first random pattern RDP1 based on the flag signal FGS, and output the inverted first random pattern RDP1 as the second random pattern RDP2. The calculation unit 233 may perform a logic operation, for example, an exclusive OR logic operation, on the random read data RDRD and the second random pattern RDP2, and output the read data RD.

In the lower Example 52, the inversion unit 234 may receive the disabled flag signal FGS based on the most significant bit "0" of the flag corresponding to the first memory block B1. The inversion unit 234 may non-invert the first random pattern RDP1 based on the flag signal FGS, and output the non-inverted first random pattern RDP1 as the second random pattern RDP2. The calculation unit 233 may perform a logic operation, for example, an exclusive OR logic operation, on the random read data RDRD and the second random pattern RDP2, and output the read data RD.

Figure 15:
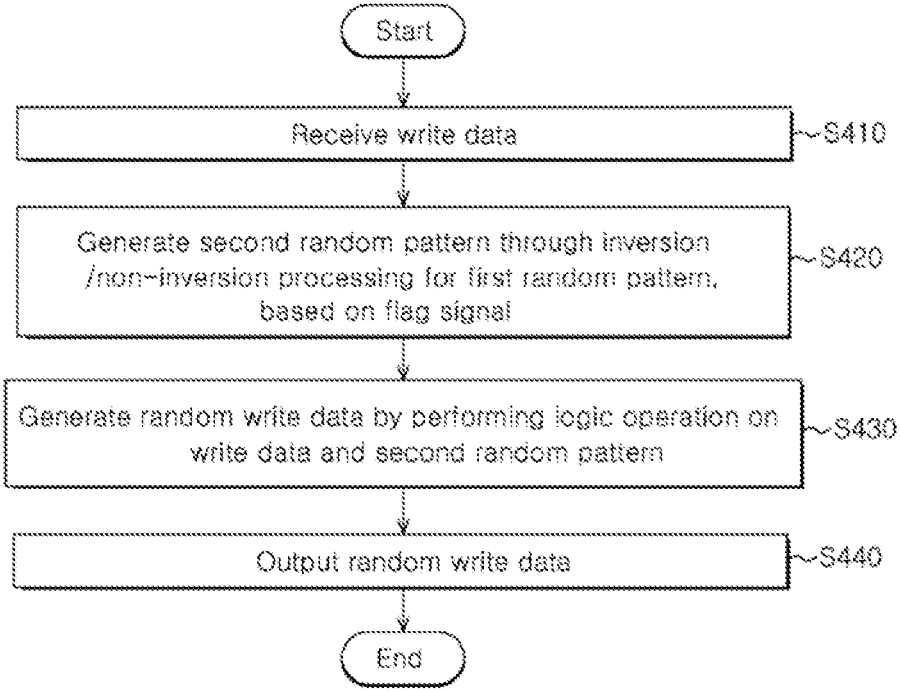
FIG. 15 is a flow chart explaining an operating method of the conversion block shown in FIG. 12.

FIG. 15 is a flow chart explaining an operating method of the conversion block 130_2 shown in FIG. 12.

Hereinbelow, the scramble operation of the conversion block 130_2 will be described in detail with reference to FIGS. 12 and 15.

Referring to FIG. 15, at step S410, the conversion block 130_2 may receive the write data WD.

At step S420, the inversion unit 234 may generate the second random pattern RDP2 through inversion/non-inversion processing for the first random pattern RDP1 based on the flag signal FGS.

At step S430, the calculation unit 233 may generate the random write data RDWD by performing a logic operation on the write data WD and the second random pattern RDP2.

At step S440, the conversion block 130_2 may output the random write data RDWD.

Figure 16:
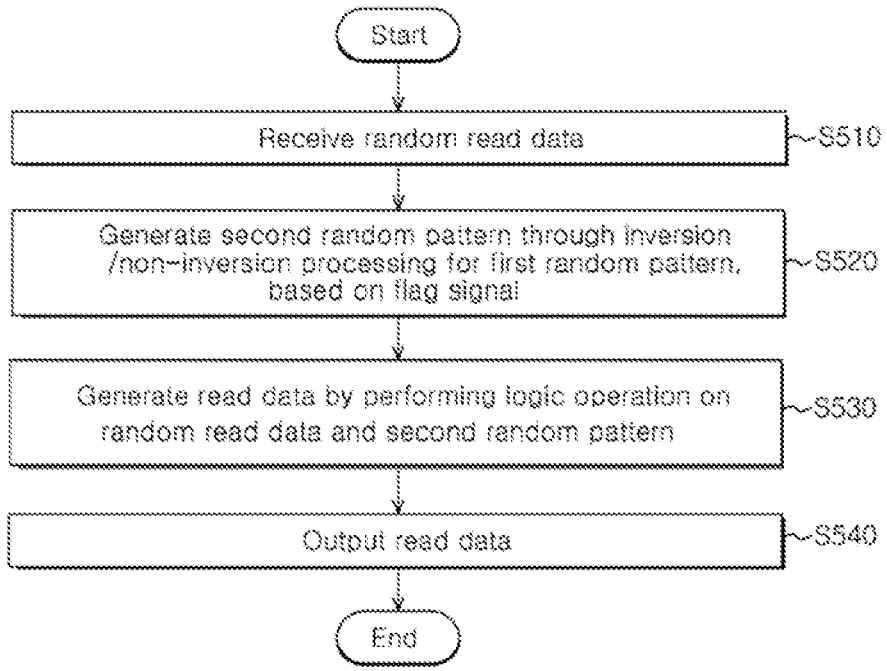
FIG. 16 is a flow chart explaining an operating method of the conversion block shown in FIG. 12.

FIG. 16 is a flow chart explaining an operating method of the conversion block 130_2 shown in FIG. 12.

Hereinbelow, the descramble operation of the conversion block 130_2 will be described in detail with reference to FIGS. 12 and 16.

Referring to FIG. 16, at step S510, the conversion block 130_2 may receive the random read data RDRD.

At step S520, the inversion unit 234 may generate the second random pattern RDP2 through inversion/non-inversion processing for the first random pattern RDP1 based on the flag signal FGS.

At step S530, the calculation unit 233 may generate the read data RD by performing a logic operation on the random read data RDRD and the second random pattern RDP2.

At step S540, the conversion block 130_2 may output the read data RD.

Figure 17:
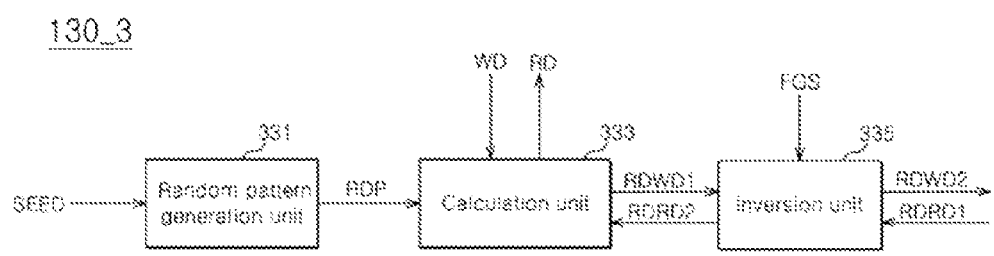
FIG. 17 is a block diagram illustrating an exemplary embodiment of a conversion block shown in FIG. 1.

FIG. 17 is a block diagram illustrating an exemplary embodiment of the conversion block 130 shown in FIG. 1.

Referring to FIG. 17, the conversion block 130_3 may receive write data WD, perform a scramble operation on the write data WD, and output the scrambled write data WD as second random write data RDWD2. The second random write data RDWD2 may be written in the memory apparatus 200, and be read as first random read data RDRD1 from the memory apparatus 200. The conversion block 130_3 may receive the first random read data RDRD1 read from the memory apparatus 200, perform a descramble operation on the first random read data RDRD1, and output the descrambled first random read data RDRD1 as read data RD.

The conversion block 130_3 may include a random pattern generation unit 331, a calculation unit 333, and an inversion unit 335.

The random pattern generation unit 331 may receive a seed data SEED, and output a random pattern RDP based on the seed data SEED. The random pattern generation unit 331 may be configured and operate in substantially the same way as the random pattern generation unit 131 of FIG. 3.

In the scramble operation, the calculation unit 333 may perform a logic operation on the write data WD and the random pattern RDP, and output a first random write data RDWD1. In the descramble operation, the calculation unit 333 may perform a logic operation on a second random read data RDRD2 and the random pattern RDP, and output the read data RD. The logic operation of the calculation unit 333 may be, for example, an exclusive OR logic operation.

In the scramble operation, the inversion unit 335 may receive the first random write data RDWD1, invert/non-invert the first random write data RDWD1 based on the flag signal FGS, and output the second random write data RDWD2. The inversion unit 335 may invert the first random write data RDWD1 when the flag signal FGS is enabled, and output the inverted first random write data RDWD1 as the second random write data RDWD2. The inversion unit 335 may non-invert the first random write data RDWD1 when the flag signal FGS is disabled, and output the non-inverted first random write data RDWD1 as the second random write data RDWD2.

In the descramble operation, the inversion unit 335 may receive the first random read data RDRD1, invert/non-invert the first random read data RDRD1 based on the flag signal FGS, and output the second random read data RDRD2. The inversion unit 335 may invert the first random read data RDRD1 when the flag signal FGS is enabled, and output the inverted first random read data RDRD1 as the second random read data RDRD2. The inversion unit 335 may non-invert the first random read data RDRD1 when the flag signal FGS is disabled, and output the non-inverted first random read data RDRD1 as the second random read data RDRD2.

Figure 18:
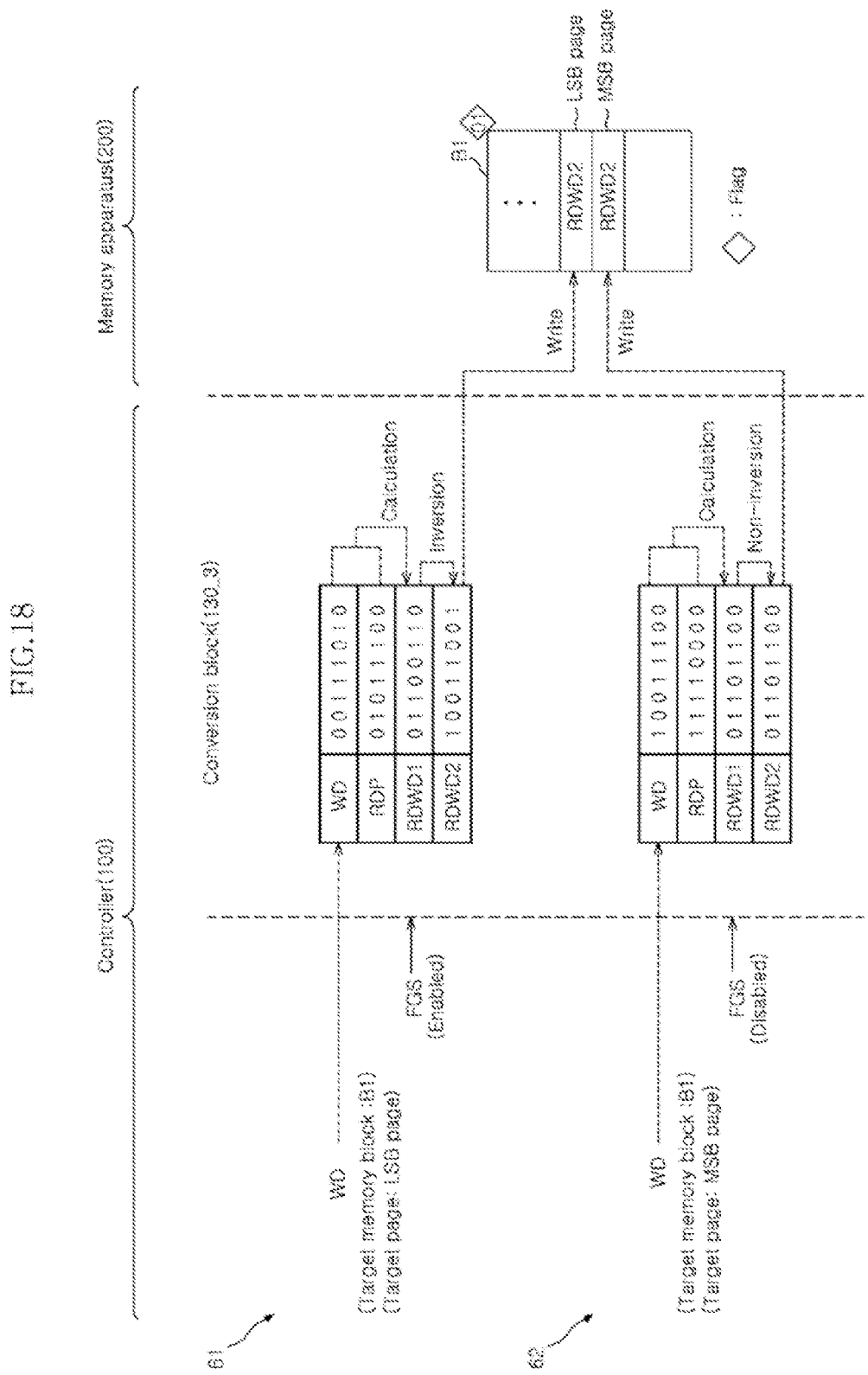
FIG. 18 is a diagram explaining a scramble operation of the conversion block shown in FIG. 17.
Figure 19:
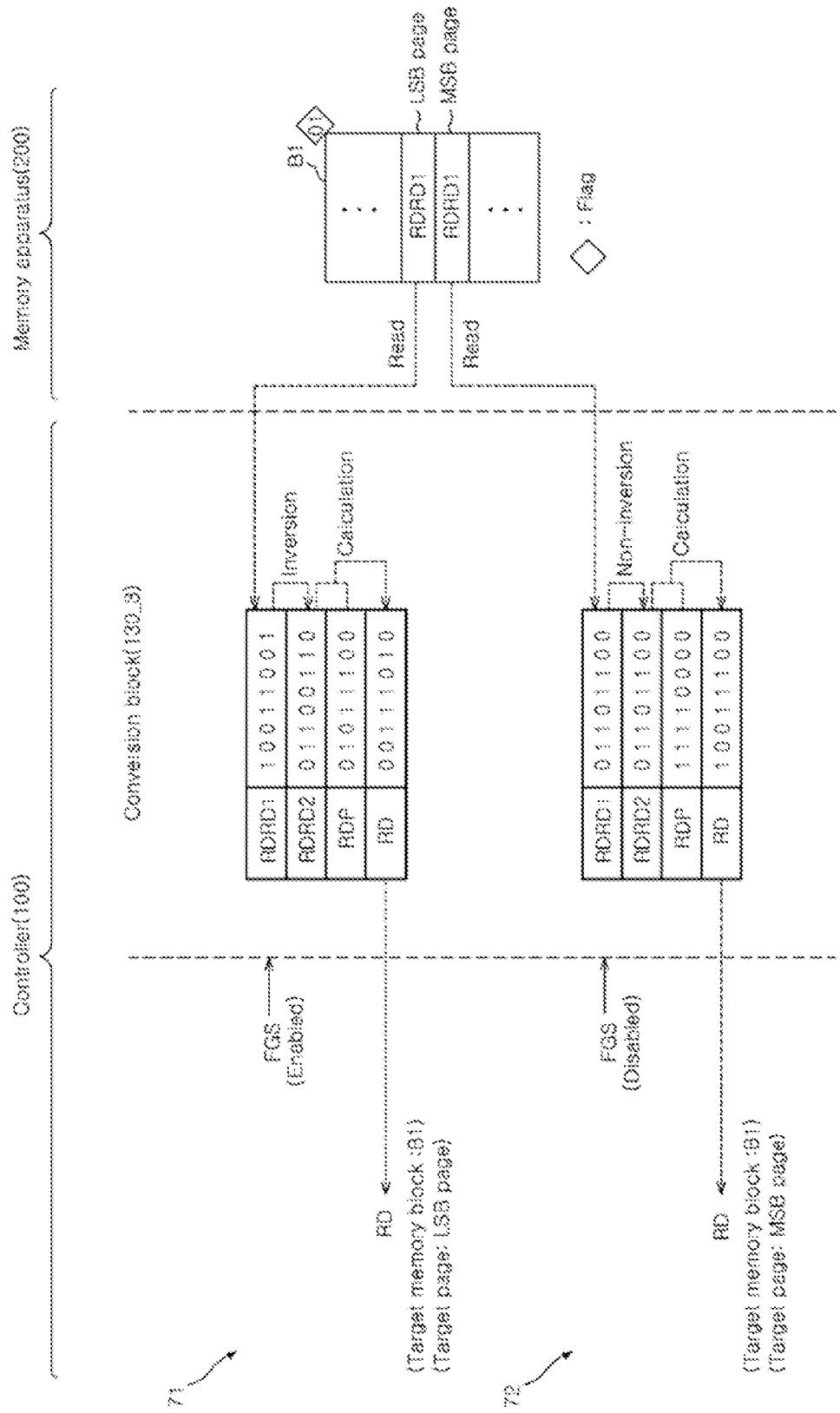
FIG. 19 is a diagram explaining a descramble operation of the conversion block shown in FIG. 17.

FIG. 18 is a diagram explaining the scramble operation of the conversion block 130_3 shown in FIG. 17. FIG. 19 is a diagram explaining the descramble operation of the conversion block 130_3 shown in FIG. 17.

Referring to FIGS. 18 and 19, it is assumed that a flag corresponding to the first memory block B1 of the memory apparatus 200 is set to "01". In FIGS. 18 and 19, it is assumed that inversion/non-inversion processing is performed in response to a flag set to 2 bits as described above with reference to FIG. 7.

Hereinbelow, the scramble operation of the conversion block 130_3 will be described in detail with reference to FIGS. 17 and 18.

In the upper Example 61 and the lower Example 62, the conversion block 130_3 may receive the write data WD, scramble the write data WD, and output the second random write data RDWD2. A target memory block of the memory apparatus 200 in which the second random write data RDWD2 are to be written may be the first memory block B1.

A target page may be an LSB page in the upper Example 61 and an MSB page in the lower Example 62.

In the upper Example 61, the calculation unit 333 may receive the write data WD. The random pattern generation unit 331 may output the random pattern RDP. The calculation unit 333 may perform a logic operation, for example, an exclusive OR logic operation, on the write data WD and the random pattern RDP, and output the first random write data RDWD1. The inversion unit 335 may receive the enabled flag signal FGS based on the least significant bit "1" of the flag corresponding to the first memory block B1. The inversion unit 335 may invert the first random write data RDWD1 based on the flag signal FGS, and output the inverted first random write data RDWD1 as the second random write data RDWD2. The outputted second random write data RDWD2 may be transmitted to the memory apparatus 200, and be written in the LSB page of the first memory block B1.

In the lower Example 62, the inversion unit 335 may receive the disabled flag signal FGS based on the most significant bit "0" of the flag corresponding to the first memory block B1. The inversion unit 335 may non-invert the first random write data RDWD1 based on the flag signal FGS, and output the non-inverted first random write data RDWD1 as the second random write data RDWD2. The outputted second random write data RDWD2 may be transmitted to the memory apparatus 200, and be written in the MSB page of the first memory block B1.

Hereinbelow, the descramble operation of the conversion block 130_3 will be described in detail with reference to FIGS. 17 and 19.

In the upper Example 71 and the lower Example 72, the conversion block 130_3 may receive scrambled data, that is, the first random read data RDRD1, descramble the first random read data RDRD1, and output original data, that is, the read data RD. A target memory block of the memory apparatus 200 from which the first random read data RDRD1 are read may be the first memory block B1. A target page may be an LSB page in the upper Example 71 and an MSB page in the lower Example 72.

In the upper Example 71, the inversion unit 335 may receive the first random read data RDRD1. The inversion unit 335 may receive the enabled flag signal FGS based on the least significant bit "1" of the flag corresponding to the first memory block B1. The inversion unit 335 may invert the first random read data RDRD1 based on the flag signal FGS, and output the inverted first random read data RDRD1 as the second random read data RDRD2. The random pattern generation unit 331 may output the random pattern RDP. The calculation unit 333 may perform a logic operation, for example, an exclusive OR logic operation, on the second random read data RDRD2 and the random pattern RDP, and output the read data RD.

In the lower Example 72, the inversion unit 335 may receive the disabled flag signal FGS based on the most significant bit "0" of the flag corresponding to the first memory block B1. The inversion unit 335 may non-invert the first random read data RDRD1 based on the flag signal FGS, and output the non-inverted first random read data RDRD1 as the second random read data RDRD2. The calculation unit 333 may perform a logic operation, for example, an exclusive OR logic operation, on the second random read data RDRD2 and the random pattern RDP, and output the read data RD.

Figure 20:
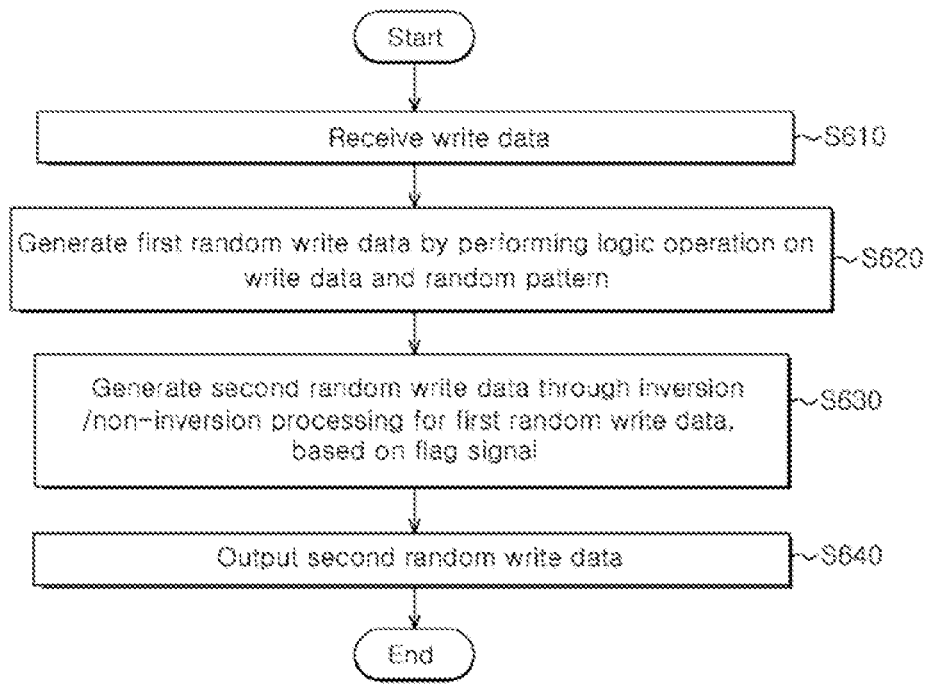
FIG. 20 is a flow chart explaining an operating method of the conversion block shown in FIG. 17.

FIG. 20 is a flow chart explaining an operating method of the conversion block 130_3 shown in FIG. 17.

Hereinbelow, the scramble operation of the conversion block 130_3 will be described in detail with reference to FIGS. 17 and 20.

Referring to FIG. 20, at step S610, the conversion block 130_3 may receive the write data WD.

At step S620, the calculation unit 333 may generate the first random write data RDWD1 by performing a logic operation on the write data WD and the random pattern RDP.

At step S630, the inversion unit 335 may generate the second random write data RDWD2 through inversion/non-inversion processing for the first random write data RDWD1 based on the flag signal FGS.

At step S640, the conversion block 130_3 may output the second random write data RDWD2.

Figure 21:
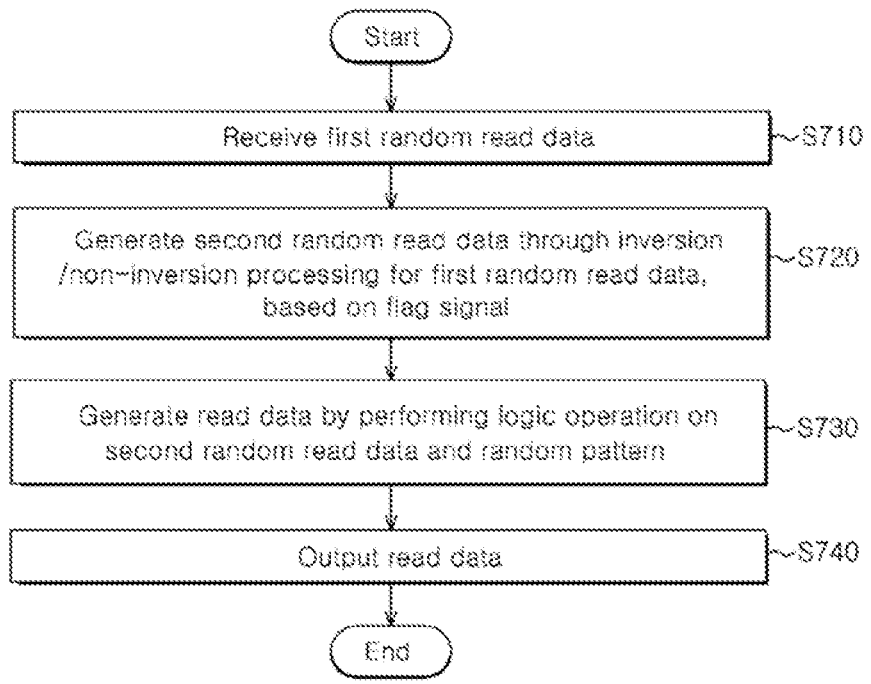
FIG. 21 a flow chart explaining an operating method of the conversion block shown in FIG. 17.

FIG. 21 is a flow chart explaining an operating method of the conversion block 130_3 shown in FIG. 17.

Hereinbelow, the descramble operation of the conversion block 130_3 will be described in detail with reference to FIGS. 17 and 21.

Referring to FIG. 21, at step S710, the conversion block 130_3 may receive the first random read data RDRD1.

At step S720, the inversion unit 335 may generate the second random read data RDRD2 through inversion/non-inversion processing for the first random read data RDRD1 based on the flag signal FGS.

At step S730, the calculation unit 333 may generate the read data RD by performing a logic operation on the second random read data RDRD2 and the random pattern RDP.

At step S740, the conversion block 130_3 may output the read data RD.

Figure 22:
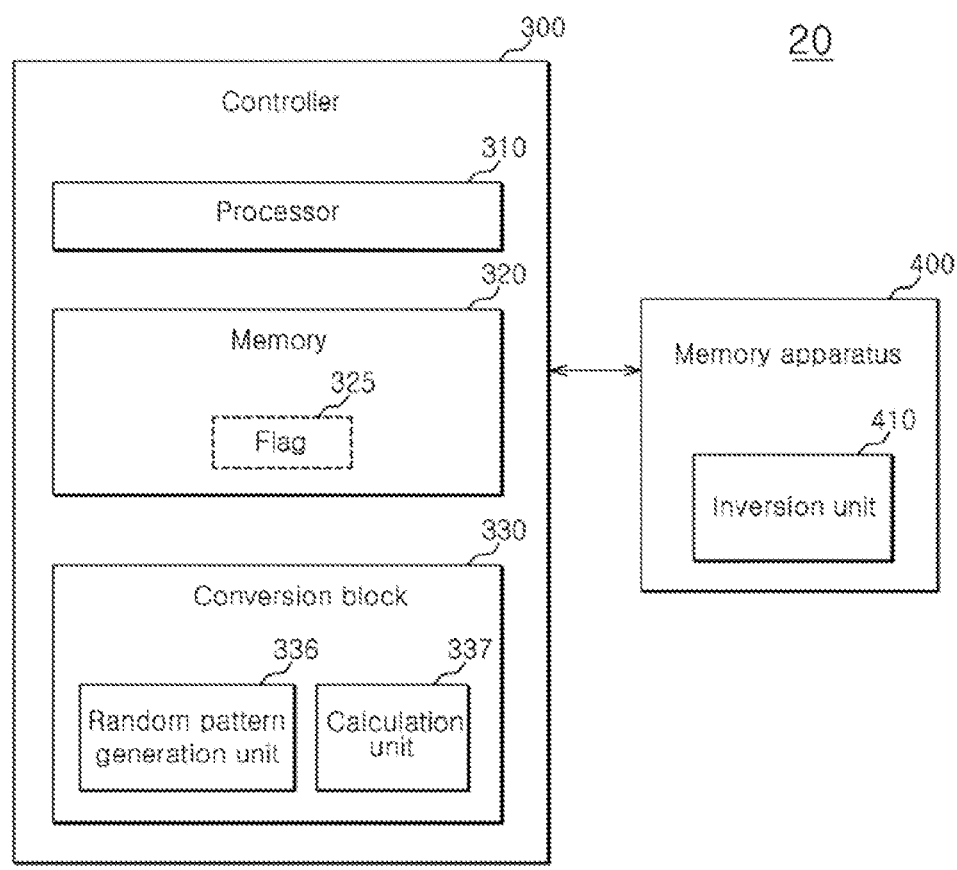
FIG. 22 is a block diagram illustrating a data storage device in accordance with an embodiment of the present invention.

FIG. 22 is a block diagram illustrating a data storage device in accordance with an embodiment.

Referring to FIG. 22, the data storage device 20 may be configured in substantially the same way as the data storage device 10 of FIG. 1 except that an inversion unit 410 is included not in a conversion block 330 but in a memory apparatus 400.

The data storage device 20 may include a controller 300 and the memory apparatus 400.

The controller 300 may include a processor 310, a memory 320, and the conversion block 330. The processor 310 may transmit a control signal for controlling inversion/non-inversion processing of the inversion unit 410, to the memory apparatus 400, based on flag information 325. For example, the processor 310 may transmit the control signal to the memory apparatus 400, by including the control signal in a write or read command.

The conversion block 330 may include a random pattern generation unit 336 and a calculation unit 337. The random pattern generation unit 336 and the calculation unit 337 may be configured and operate in substantially the same way as the random pattern generation unit 331 and the calculation unit 333 of FIG. 17.

The memory apparatus 400 may include the inversion unit 410. The inversion unit 410 may perform the inversion/non-inversion processing under the control of the processor 310. The inversion unit 410 may be configured and operate in substantially the same way as the inversion unit 335 of FIG. 17.

For reference, in FIG. 22, the calculation unit 337 of the conversion block 330 may perform a logic operation, for example, an exclusive OR logic operation, on write data and random pattern inputted from the random pattern generation unit 336, and output first random write data to the inversion unit 410 of the memory apparatus 400 during a scramble operation. During a descramble operation, the inversion unit 410 of the memory apparatus 400 may invert/non-invert first random read data based on a flag signal, and output second random read data to the calculation unit 337 of the conversion block 330 in the controller 300 during a descramble operation.

While various embodiments have been described above, it will be understood to those skilled in the art that the embodiments are examples only. Accordingly, the data storage device and the operating method thereof described herein should not be limited based on the described embodiments.

What is claimed is:

1. A data storage device comprising:
a conversion block configured to perform a scramble operation on write data, and generate random write data to be stored in a target page in a target memory block having a first subset of pages and a second subset of pages exclusive of the first subset of pages; and
a processor configured to set a remainder when dividing an erase count of the target memory block by a predetermined value, as a flag corresponding to the target memory block,
wherein the scramble operation includes inversion/non-inversion processing based on the flag and calculation processing based on a random pattern,
wherein a least significant bit in the flag corresponds to the first subset of pages, and a most significant bit in the flag corresponds to the second subset of pages, and
wherein the inversion processing is performed on the target page in the first subset of pages when the least significant bit has a first value set and performed on the target page in the second subset of pages when the most significant bit has the first value set.

2. The data storage device according to claim 1, wherein the conversion block comprises:
an inversion unit configured to perform the inversion/non-inversion processing; and
a calculation unit configured to perform the calculation processing based on the random pattern.

3. The data storage device according to claim 1, wherein the
processor controls the inversion/non-inversion processing of the inversion unit in response to the flag.

4. The data storage device according to claim 1, wherein the processor sets the flag each time the target memory block is erased.

5. The data storage device according to claim 1, wherein the processor updates the erase count when erasing the target memory block and resets the flag based on an updated erase count.

6. The data storage device according to claim 2,
wherein the inversion unit outputs second write data by inverting/non-inverting the write data, and
wherein the calculation unit outputs the random write data by performing a logic operation on the second write data and the random pattern.

7. The data storage device according to claim 2,
wherein the inversion unit outputs a second random pattern by inverting/non-inverting the random pattern, and
wherein the calculation unit outputs the random write data by performing a logic operation on the write data and the second random pattern.

8. The data storage device according to claim 2,
wherein the calculation unit outputs first random write data by performing a logic operation on the write data and the random pattern, and
wherein the inversion unit outputs the random write data by inverting/non-inverting the first random write data.

9. The data storage device according to claim 1, further comprising:
a nonvolatile memory apparatus, including the target memory block, configured to perform a write operation to write the random write data in the target page.

10. A data storage device comprising:
a conversion block configured to output first random write data by performing a logic operation on write data and a random pattern;
a processor; and
a nonvolatile memory apparatus,
the nonvolatile memory apparatus comprising:
an inversion unit configured to output second random write data by inverting/non-inverting the first random write data depending on a flag;
a target memory block including a first subset of pages and a second subset of pages exclusive of the first subset of pages; and
a control logic configured to store the second random write data in a target page of the target memory block,
wherein the processor sets a reminder when dividing an erase count of the target memory block by a predetermined value, as the flag corresponding to the target memory block,
wherein the flag includes a least significant flag bit corresponding to the first subset of pages included in the target memory block and a most significant flag bit corresponding to the second subset of pages included in the target memory block, and
wherein the inversion unit inverts the first random write data when the least significant flag bit is a first value and inverts the first random write data when the most significant flag bit is the first value.

11. The data storage device according to claim 10, wherein the
processor controls the inversion unit in response to the flag corresponding to the target memory block.

12. The data storage device according to claim 10, wherein the processor sets the flag each time the target memory block is erased.

13. The data storage device according to claim 10, wherein the processor updates the erase count when erasing the target memory block and resets the flag based on an updated erase count.

14. An operating method for a data storage device, comprising:
setting a remainder when dividing an erase count of a target memory block by a predetermined value, as a flag corresponding to the target memory block;
generating random write data to be stored in a target page in the target memory block including a first subset of pages and a second subset of pages exclusive of the first subset of pages, by performing a scramble operation on write data,
the generating of the random write data comprising:
performing inversion/non-inversion processing based on the flag; and
performing calculation processing based on a random pattern,
wherein the flag includes a least significant flag bit corresponding to the first subset of pages included in the target memory block and a most significant flag bit corresponding to the second subset of pages included in the target memory block, and wherein the inversion processing is performed on the target page in the first subset of pages when the at least significant bit has a first value set and performed on the target page in the second subset of pages when the most significant bit has the first value set.

15. The operating method according to claim 14, further comprising:
setting the flag each time the target memory block is erased.

16. The operating method according to claim 14, further comprising:
updating the erase count when erasing the target memory block; and
resetting the flag based on an updated erase count.

17. The operating method according to claim 14,
wherein the performing of the inversion/non-inversion processing comprises outputting second write data by inverting/non-inverting the write data, and
wherein the performing of the calculation processing comprises outputting the random write data by performing a logic operation on the second write data and the random pattern.

18. The operating method according to claim 14,
wherein the performing of the inversion/non-inversion processing comprises outputting a second random pattern by inverting/non-inverting the random pattern, and
wherein the performing of the calculation processing comprises outputting the random write data by performing a logic operation on the write data and the second random pattern.

19. The operating method according to claim 14,
wherein the performing of the calculation processing comprises outputting first random write data by performing a logic operation on the write data and the random pattern, and
wherein the performing of the inversion/non-inversion processing comprises outputting the random write data by inverting/non-inverting the first random write data.

20. The operating method according to claim 14, further comprising:
storing the random write data in the target page of a nonvolatile memory apparatus.

* * * * *